US011372473B2

(12) United States Patent
Shimizu

(10) Patent No.: US 11,372,473 B2
(45) Date of Patent: Jun. 28, 2022

(54) INFORMATION PROCESSING APPARATUS AND INFORMATION PROCESSING METHOD

(71) Applicant: SONY CORPORATION, Tokyo (JP)

(72) Inventor: Takayoshi Shimizu, Chiba (JP)

(73) Assignee: SONY CORPORATION, Tokyo (JP)

( * ) Notice: Subject to any disclaimer, the term of this patent is extended or adjusted under 35 U.S.C. 154(b) by 274 days.

(21) Appl. No.: 16/606,346

(22) PCT Filed: Mar. 13, 2018

(86) PCT No.: PCT/JP2018/009601
§ 371 (c)(1),
(2) Date: Oct. 18, 2019

(87) PCT Pub. No.: WO2018/211798
PCT Pub. Date: Nov. 22, 2018

(65) Prior Publication Data
US 2021/0333862 A1      Oct. 28, 2021

(30) Foreign Application Priority Data
May 18, 2017   (JP) .............................. JP2017-098755

(51) Int. Cl.
*G06F 3/01*       (2006.01)
*G06V 40/20*    (2022.01)

(52) U.S. Cl.
CPC .............. *G06F 3/011* (2013.01); *G06V 40/23* (2022.01)

(58) Field of Classification Search
CPC .......................... G06F 3/011; G06K 9/00342
See application file for complete search history.

(56) References Cited

U.S. PATENT DOCUMENTS

2010/0238182 A1   9/2010 Geisner et al.
2011/0298827 A1  12/2011 Perez
(Continued)

FOREIGN PATENT DOCUMENTS

CA    2752699 A1   9/2010
CN  102362293 A    2/2012
(Continued)

OTHER PUBLICATIONS

Office Action for JP Patent Application No. 2019-519083, dated Mar. 16, 2021, 3 pages of English Translation and 3 pages of Office Action.
(Continued)

*Primary Examiner* — Muhammad N Edun
(74) *Attorney, Agent, or Firm* — Chip Law Group

(57) ABSTRACT

It is desirable to enhance the human-like motion of an object. Provided is an information processing apparatus including: a motion control unit configured to control, when an abnormality of a signal input for controlling a motion of an object is detected, the motion of the object such that the object continues a predetermined motion until a normality of the signal input is detected, the signal input responding to a motion of a user, in which until the motion of the object transitions to the predetermined motion after the detection of the abnormality of the signal input, the motion control unit controls the object such that the object performs at least one first intermediate motion, the at least one first intermediate motion being different from the motion of the object at the detection of the abnormality of the signal input and the predetermined motion.

21 Claims, 17 Drawing Sheets

(56) References Cited

U.S. PATENT DOCUMENTS

| | | | |
|---|---|---|---|
| 2012/0159290 A1* | 6/2012 | Pulsipher | G06K 9/38 |
| | | | 714/819 |
| 2016/0086500 A1* | 3/2016 | Kaleal, III | G06Q 10/0639 |
| | | | 434/257 |
| 2017/0090554 A1* | 3/2017 | Pececnik | G06F 3/005 |
| 2017/0132828 A1* | 5/2017 | Zelenin | A63F 13/45 |
| 2019/0336825 A1* | 11/2019 | Douglas | G06K 9/00342 |

FOREIGN PATENT DOCUMENTS

| | | |
|---|---|---|
| CN | 102918489 A | 2/2013 |
| JP | 2006-146435 A | 6/2006 |
| JP | 2012-521038 A | 9/2012 |
| JP | 2013-533537 A | 8/2013 |
| WO | 2010/107575 A2 | 9/2010 |
| WO | 2011/153078 A2 | 12/2011 |

OTHER PUBLICATIONS

International Search Report and Written Opinion of PCT Application No. PCT/JP2018/009601, dated Apr. 24, 2018, 8 pages of ISRWO.

\* cited by examiner

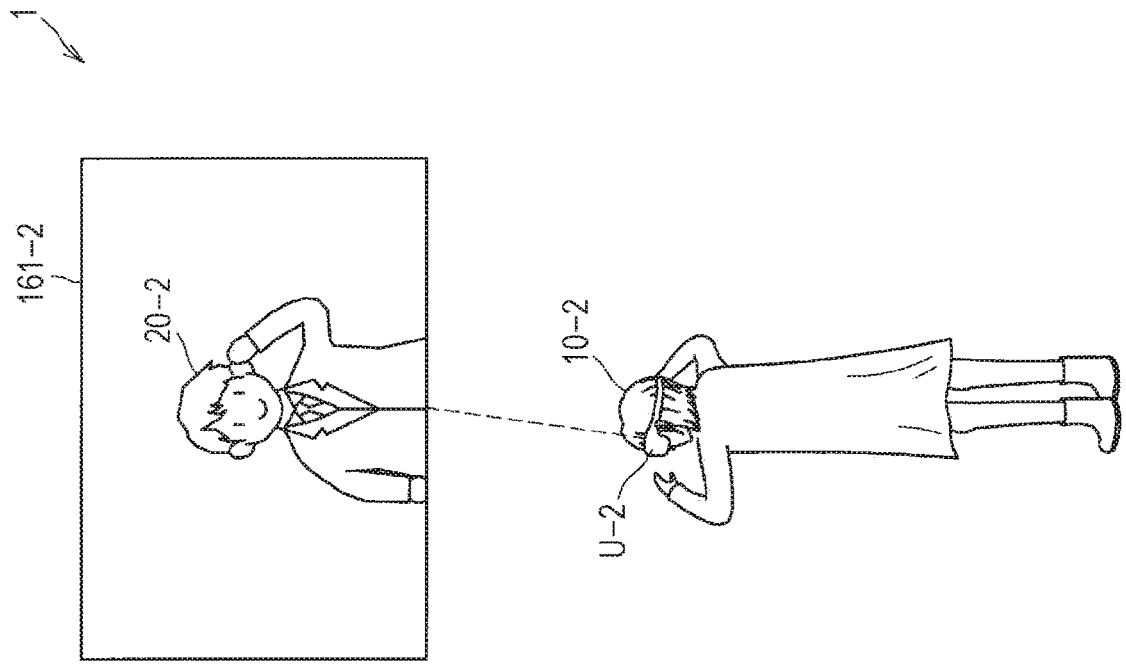
FIG. 1
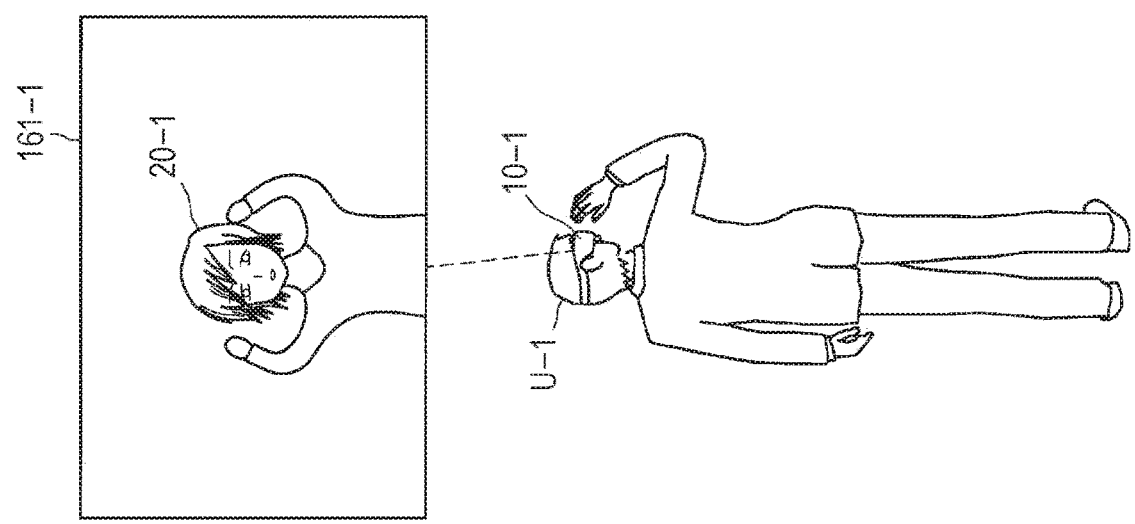

FIG. 5
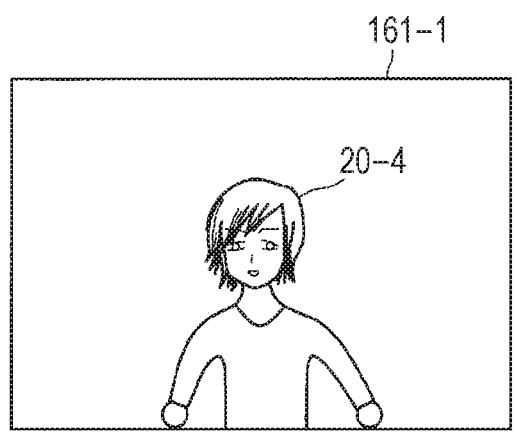
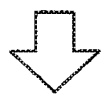
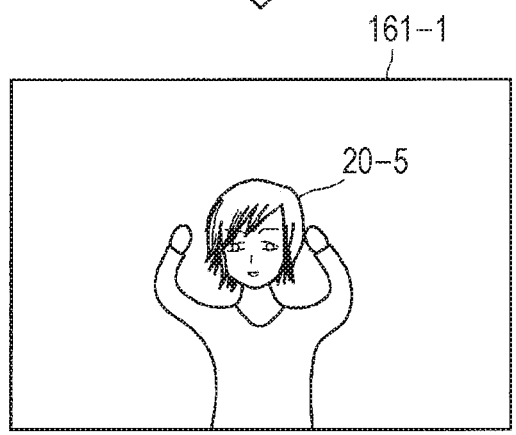

FIG. 7
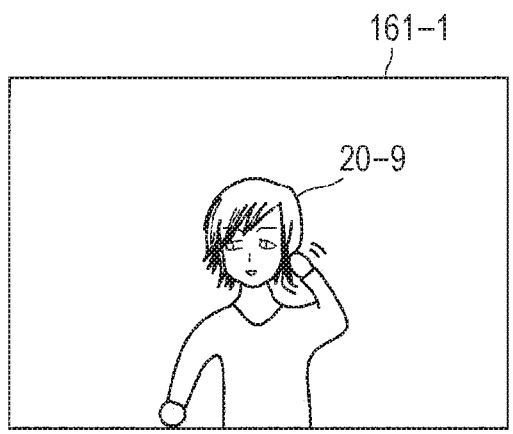
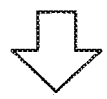
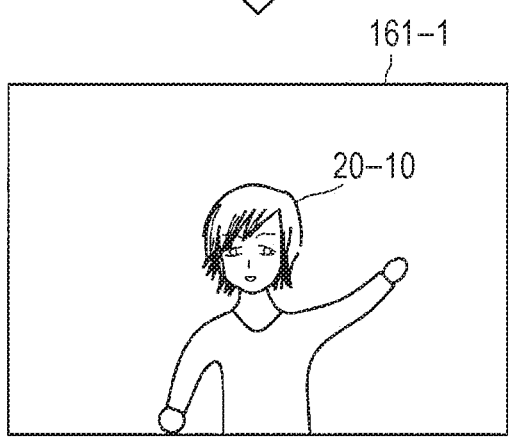
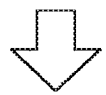
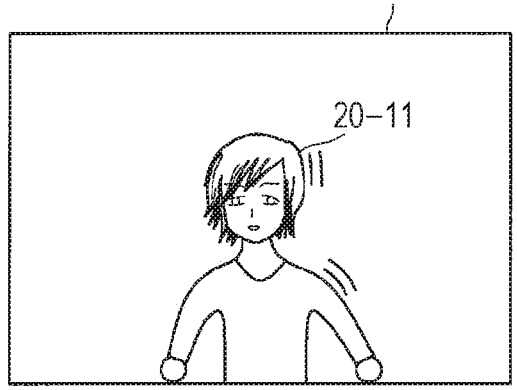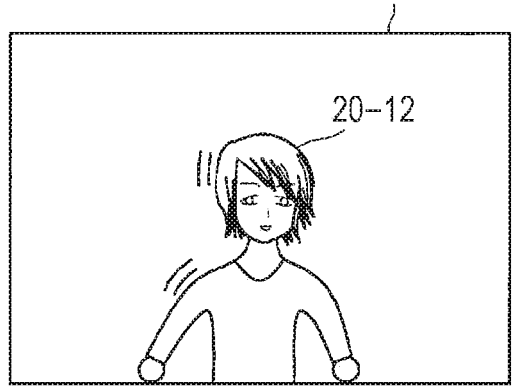

FIG. 14
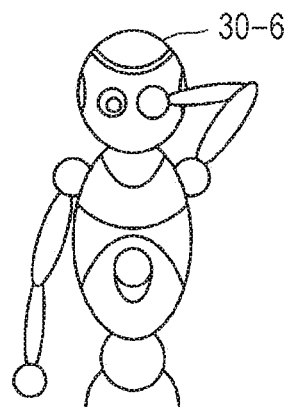
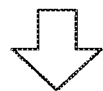
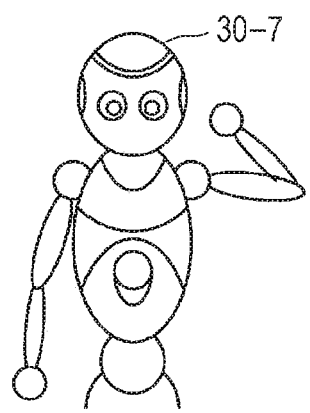
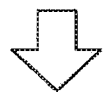
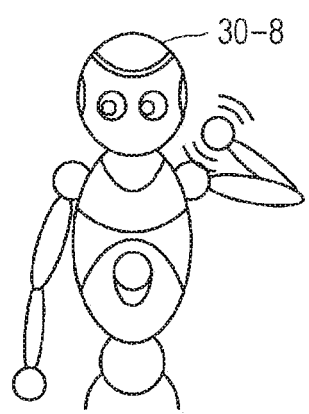

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2018/009601 filed on Mar. 13, 2018, which claims priority benefit of Japanese Patent Application No. JP 2017-098755 filed in the Japan Patent Office on May 18, 2017. Each of the above-referenced applications is hereby incorporated herein by reference in its entirety.

TECHNICAL FIELD

The present disclosure relates to an information processing apparatus, an information processing method, and a program.

BACKGROUND ART

There have recently been known techniques of controlling the motion of an object. Examples of the object include a real object existing in real space, virtual objects existing in virtual space, and the like. Examples of the virtual object include a character corresponding to the user (hereinafter referred to as "avatar").

As an example of a technique of controlling the motion of an object, there has been disclosed a technique of controlling an avatar as an exemplary virtual object, on the basis of the operation of a controller by a user (See, for example, Patent Document 1). The motion of the object is normally controlled in response to the motion of the user, so that the object behaves like a human.

CITATION LIST

Patent Document

Patent Document 1: Japanese Patent Application Laid-Open No. 2014-149836

SUMMARY OF THE INVENTION

Problems to be Solved by the Invention

However, a case may arise in which an abnormality of a signal input for controlling the motion of an object is detected. In the case, it is difficult to control the motion of the object responsive to the motion of the user. Thus, there is a possibility that human-like motion of the object is impaired. Therefore, it is desirable to provide a technique capable of enhancing the human-like motion of the object.

Solutions to Problems

According to the present disclosure, there is provided an information processing apparatus including: a motion control unit configured to control when an abnormality of a signal input for controlling a motion of an object is detected, the object such that the object continues a predetermined motion until a normality of the signal input is detected, the signal input responding to a motion of a user, in which until the motion of the object transitions to the predetermined motion after the detection of the abnormality of the signal input, the motion control unit controls the object such that the object performs at least one first intermediate motion, the at least one first intermediate motion being different from the motion of the object at the detection of the abnormality of the signal input and the predetermined motion.

According to the present disclosure, there is provided an information processing method with a processor, the method including: controlling, when an abnormality of a signal input for controlling a motion of an object is detected, the object such that the object continues a predetermined motion until a normality of the signal input is detected, the signal input responding to a motion of a user; and controlling, until the motion of the object transitions to the predetermined motion after the detection of the abnormality of the signal input, the object such that the object performs at least one first intermediate motion, the at least one first intermediate motion being different from the motion of the object at the detection of the abnormality of the signal input and the predetermined motion.

According to the present disclosure, there is provided a program for causing a computer to function as an information processing apparatus including: a motion control unit configured to control, when an abnormality of a signal input for controlling a motion of an object is detected, the object such that the object continues a predetermined motion until a normality of the signal input is detected, signal input responding to a motion of a user, in which until the motion of the object transitions to the predetermined motion after the detection of the abnormality of the signal input, the motion control unit controls the object such that the object performs at least one first intermediate motion, the at least one first intermediate motion being different from the motion of the object at the detection of the abnormality of the signal input and the predetermined motion.

Effects of the Invention

As described above, according to the present disclosure, there is provided a technique capable of enhancing the human-like motion of an object. Note that the above effect is not necessarily limited; and in addition to or instead of the above effect, there may also be exhibited any of effects indicated in the present specification or another effect that can be grasped from the present specification.

BRIEF DESCRIPTION OF DRAWINGS

FIG. 1 is an illustration of an exemplary configuration of an information processing system according to a first embodiment of the present disclosure.

FIG. 5 is an illustration of an exemplary motion control of an avatar when a normality of a signal input for controlling the motion of the avatar is detected.

FIG. 7 is an illustration of an exemplary motion control of the avatar when the abnormality is detected beyond a second period of time.

FIG. 14 is an illustration of an exemplary motion control of the robot when an abnormality is detected beyond a first period of time.

MODE FOR CARRYING OUT THE INVENTION

Figure 2:
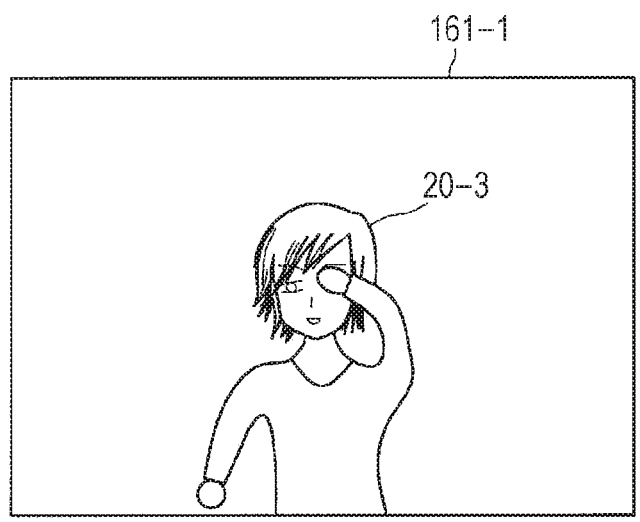
FIG. 2 is an illustration of an exemplary situation where communication is hindered.

Preferred embodiments of the present disclosure will be described in detail below with reference to the accompanying drawings. Note that, in the present specification and the drawings, the same reference signs are given to constituent elements having substantially the same functional configurations, and redundant description thereof will be omitted.

Furthermore, in the present specification and the drawings, a plurality of constituent elements having substantially the same or similar functional configurations may be distinguished from each other by giving the same reference signs followed by numbers that are different from each other. However, when it is not necessary to particularly distinguish each of the plurality of constituent elements having substantially the same or similar functional configurations, only the same reference signs are given. Furthermore, similar constituent elements of different embodiments may be distinguished with the same reference signs followed by alphabets that are different from each other. However, when it is not necessary to particularly distinguish each of the similar constituent elements, only the same reference signs are given.

Note that, the description will be given in the following order.
1. First Embodiment
   1.1. Exemplary Configuration of System
   1.2. Exemplary Functional Configuration of Information Processing Apparatus
   1.3. Functional Details of Information Processing System
2. Second Embodiment
   2.1 Exemplary Configuration of System
   2.2. Exemplary Functional Configuration of Information Processing Apparatus
   2.3. Functional Details of Information Processing System
3. Third Embodiment
   3.1. Exemplary Configuration of System
   3.2. Exemplary Functional Configuration of Information Processing Apparatus
   3.3. Functional Details of Information Processing System
4. Exemplary Hardware Configuration
5. Conclusion

1. FIRST EMBODIMENT

First, a first embodiment of the present disclosure will be described.

1.1. Exemplary Configuration of System

First, an exemplary configuration of an information processing system according to the first embodiment of the present disclosure will be described with reference to the drawings. FIG. 1 is an illustration of the exemplary configuration of an information processing system according to the first embodiment of the present disclosure. As illustrated in FIG. 1, an information processing system 1 according to the first embodiment of the present disclosure includes an information processing apparatus 10-1 and an information processing apparatus 10-2. The information processing apparatus 10-1 is used by a user U-1, and the information processing apparatus 10-2 is used by a user U-2.

Note that, in the first embodiment of the present disclosure, there will be mainly described a case where the information processing apparatus 10-1 is a head-mounted display (HMD) that is mounted on the head of the user U-1. The information processing apparatus 10-1, however, is not limited to an HMD. For example, the information processing apparatus 10-1 may be a smartphone or a tablet terminal. Similarly, in the first embodiment of the present disclosure, a case where the information processing apparatus 10-2 is also an HMD will be mainly described. The information processing apparatus 10-2, however, may be a smartphone or a tablet terminal.

In the example illustrated in FIG. 1, an avatar 20-1 as an exemplary virtual object is displayed on a screen 161-1 of the information processing apparatus 10-1. Here, the virtual object displayed on the screen 161-1 of the information processing apparatus 10-1 is not limited to the avatar 20-1. For example, the virtual object displayed on the screen 161-1 of the information processing apparatus 10-1 may be an agent or the like. The information processing apparatus 10-1 controls the motion of the avatar 20-1, on the basis of the motion of the user U-2.

The motion of user U-2 may be recognized in any manner. In the first embodiment of the present disclosure, a case is mainly assumed in which the motion of the user U-2 is recognized from an image captured by the information processing apparatus 10-2 (hereinafter, also simply referred to as "captured image"). Furthermore, in the first embodiment of the present disclosure, a case is mainly assumed in which the motion of the user U-2 is recognized by the information processing apparatus 10-2. However, the motion of the user U-2 may be recognized by the information processing apparatus 10-1.

Furthermore, in the first embodiment of the present disclosure, an example is mainly assumed in which voice generated by the user U-2 is output from the information processing apparatus 10-1. This arrangement allows the user U-1 to communicate with the user U-2 in more detail. For example, the voice generated by the user U-2 is detected by the information processing apparatus 10-2. The voice generated by the user U-2, however, need not be output from the information processing apparatus 10-1.

Similarly, in the example illustrated in FIG. 1, an avatar 20-2 as an exemplary virtual object is displayed on a screen 161-2 of the information processing apparatus 10-2. Here, the virtual object displayed on the screen 161-2 of the information processing apparatus 10-2 is not limited to the avatar 20-2. For example, the virtual object displayed on the screen 161-2 of the information processing apparatus 10-2 may be an agent or the like. The information processing apparatus 10-2 controls the motion of the avatar 20-2, on the basis of the motion of the user U-1.

The motion of user U-1 may be recognized in any manner. In the first embodiment of the present disclosure, a case is mainly assumed in which the motion of the user U-1 is recognized from an image captured by the information processing apparatus 10-1 (hereinafter, also simply referred to as "captured image"). Furthermore, in the first embodiment of the present disclosure, a case is mainly assumed in which the motion of the user U-1 is recognized by the information processing apparatus 10-1. However, the motion of the user U-1 may be recognized by the information processing apparatus 10-2.

Furthermore, in the first embodiment of the present disclosure, an example is mainly assumed in which voice generated by the user U-1 is output from the information processing apparatus 10-2. This arrangement allows the user U-2 to communicate with the user U-1 in more detail. For example, the voice generated by the user U-1 is detected by the information processing apparatus 10-1. The voice generated by the user U-1, however, need not be output from the information processing apparatus 10-2.

Note that the function from the recognition of the motion of the user U-2 to the control of the avatar 20-1 and the function from the recognition of the motion of the user U-1 to the control of the avatar 20-2 are similar to each other. Therefore, hereinafter, the functions from the recognition of the motion of the user U-2 to the control of the avatar 20-1 will be described as representative of both functions. The user U-1 sees the avatar 20-1 with the motion controlled on the basis of the motion of the user U-2, so that the user U-1 can communicate with the user U-2.

Here, a case may arise in which an abnormality of a signal input for controlling the motion of the avatar 20-1 is detected. In the case, it is difficult to control the motion of the avatar 20-1 responsive to the motion of the user U-2. Thus, there is a possibility that human-like motion of the avatar 20-1 is impaired.

Moreover, as a result of difficulty in controlling the motion of the avatar 20-1 responsive to the motion of the user U-2, there may arise a situation, for example, communication is hindered. An example of the situation will be described.

FIG. 2 is an illustration of the exemplary situation where communication is hindered. Referring to FIG. 2, an avatar 20-3 with the motion controlled on the basis of the motion of the user U-2 is displayed on the screen 161-1 of the information processing apparatus 10-1. In particular, in the example illustrated in FIG. 2, the user U-2 positions a hand of the user U-2 in front of the face, so that the avatar 20-3 also positions a hand of the avatar 20-3 in front of the face.

In this state, when an abnormality of a signal input for controlling the motion of the avatar 20-3 is detected, there may arise a situation, for example, the avatar 20-3 keeps the hand positioned in front of the face. When the face of the avatar 20-3 is covered with the hand as described above, the user U-1 is difficult to recognize the facial expression of the avatar 20-3. Thus, there may arise a situation, for example, communication with the user U-2 is inhibited.

Therefore, it is desirable to provide a technique capable of enhancing the human-like motion of the avatar 20-1. In particular, in the first embodiment of the present disclosure, it is assumed that the avatar 20-1 is used by the user U-1 in order to communicate with the user U-2. In the case, when the human-like motion of the avatar 20-1 is enhanced, the action of the user U-2 can be more realistically grasped. Thus, it is expected that the communication is promoted.

Note that the object whose motion is controlled by the information processing apparatus 10-1 is not limited to a virtual object such as the avatar 20-1. For example, the object whose motion is controlled by the information processing apparatus 10-1 may be a real object. In other words, the object whose motion is controlled by the information processing apparatus 10-1 may include a real object existing in real space, or may include a virtual object existing in virtual space.

The exemplary configuration of the information processing system 1 according to the first embodiment of the present disclosure has been described above.

1.2. Exemplary Functional Configuration of Information Processing Apparatus

Figure 3:
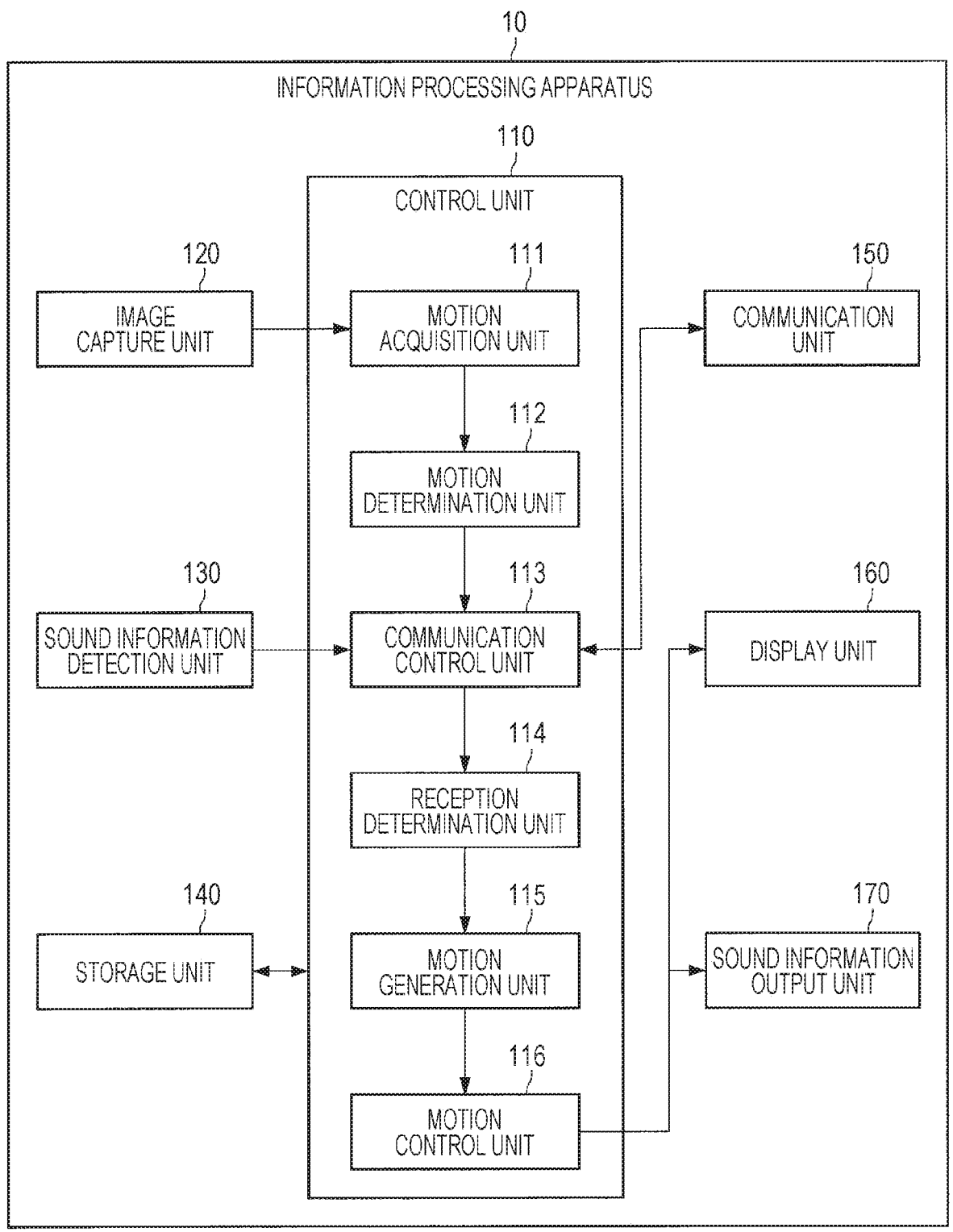
FIG. 3 is a diagram of an exemplary functional configuration of an information processing apparatus according to the first embodiment of the present disclosure.

Next, an exemplary functional configuration of an information processing apparatus 10 according to the first embodiment of the present disclosure will be described. FIG. 3 is a diagram of the exemplary functional configuration of the information processing apparatus 10 according to the first embodiment of the present disclosure. As illustrated in FIG. 3, the information processing apparatus 10 according to the first embodiment of the present disclosure includes: a control unit 110; an image capture unit 120; a sound information detection unit 130; a storage unit 140; a communication unit 150; a display unit 160; and a sound information output unit 170.

The control unit 110 controls each unit of the information processing apparatus 10. The control unit 110 includes: a motion acquisition unit 111; a motion determination unit 112; a communication control unit 113; a reception determination unit 114; a motion generation unit 115; and a motion control unit 116. Details of each of these functional blocks will be described later. Note that the control unit 110 may include, for example, one or a plurality of central processing units (CPUs), or the like. When the control unit 110 includes a processing device such as a CPU, the processing device may include an electronic circuit.

The image capture unit 120 has a function of acquiring an image by capturing a part or all of the body of the user U-1. Hereinafter, a case where the upper body of the user U1 is captured by the image capture unit 120 is mainly assumed. For example, the image capture unit 120 includes a camera (including an image sensor) and acquires an image captured by the camera. The number of the cameras included in the image capture unit 120 is not particularly limited if one or more cameras are included. Then, the position where the image capture unit 120 is provided also is not particularly limited. For example, the image capture unit 120 may be integrally formed together with the information processing apparatus 10, or may be provided separately from the information processing apparatus 10.

The sound information detection unit 130 has a function of acquiring sound information by sound collection. During speech by a user U, the sound information includes the speech of the user U. For example, the sound information detection unit 130 includes a microphone, and the microphone collects sounds. The number of sound information detection units 130 is not particularly limited if one or more sound information detection units 130 are included. Then, the position where the sound information detection unit 130 is provided also is not particularly limited. For example, the sound information detection unit 130 may be integrally formed together with the information processing apparatus 10, or may be provided separately from the information processing apparatus 10.

The storage unit 140 is a recording medium including a memory, and stores a program to be executed by the control unit 110 and data necessary for the execution of the program. Furthermore, the storage unit 140 temporarily stores data for computation by the control unit 110. The storage unit 140 includes a magnetic storage unit device, a semiconductor storage device, an optical storage device, a magneto-optical storage device, or the like.

The communication unit 150 includes a communication circuit, and has a function of acquiring data from another information processing apparatus 10 in connection to a communication network and providing data to the other information processing apparatus 10, via the communication network. For example, the communication unit 150 includes a communication interface.

The display unit 160 has a function of displaying various screens. The type of the display unit 160 is not limited. For example, the display unit 160 may be any display capable of displaying visually recognizable to the user U, or may be a liquid crystal display or an organic electro-luminescence (EL) display.

The sound information output unit 170 has a function of outputting sound information. For example, the sound information output unit 170 includes a speaker, and the speaker outputs sound information. The number of sound information output units 170 is not particularly limited if one or more sound information output units 170 are included. Then, the position where the sound information output unit 170 is provided also is not particularly limited. However, in the first embodiment of the present disclosure, it is desirable that the sound information output unit 170 is integrally formed together with the information processing apparatus 10 because it is desirable to make the user U hear the sound information output from the sound information output unit 170.

The exemplary functional configuration of the information processing apparatus 10 according to the first embodiment of the present disclosure has been described above.

1.3. Functional Details of Information Processing System

Next, the functional details of the information processing system 1 according to the first embodiment of the present disclosure will be described.

Figure 4:
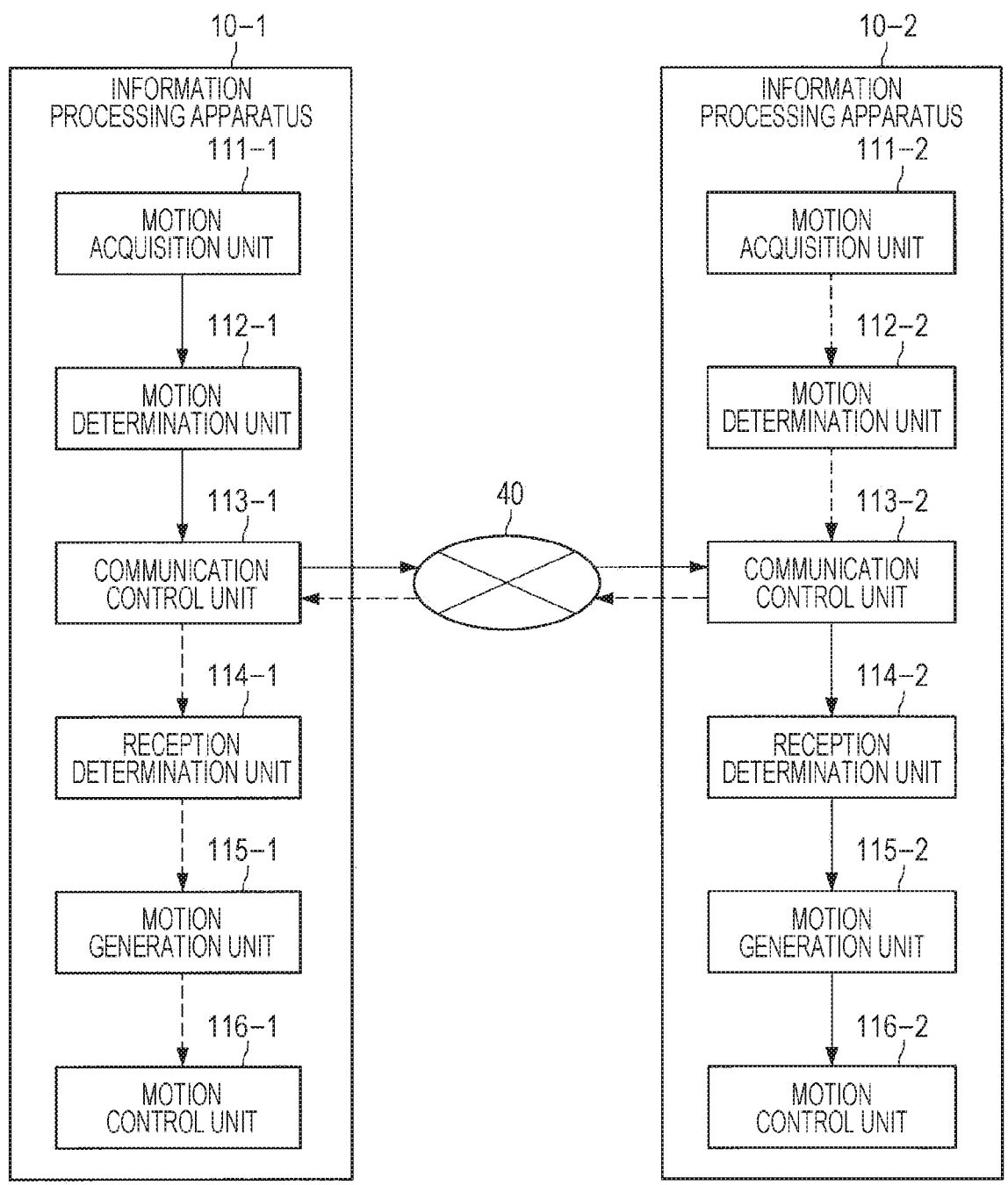
FIG. 4 is a diagram of an exemplary data flow in the information processing system.

FIG. 4 is a diagram of an exemplary data flow in the information processing system 1. Referring to FIG. 4, the information processing apparatus 10-1 and the information processing apparatus 10-2 are mutually communicable via a communication network 40. In FIG. 4, data flow in processing from the recognition of the motion of the user U-1 to the control of the avatar 20-2 is indicated by solid arrows. In contrast, data flow in processing from the recognition of the motion of the user U-2 to the control of the avatar 20-1 is indicated by broken line arrows.

First, the overview of the data flow indicated by the solid arrows in FIG. 4 will be described. At the information processing apparatus 10-1, a motion acquisition unit 111-1 recognizes the motion of the user U-1 from an image and acquires the motion of the user U-1. Furthermore, the motion acquisition unit 111-1 also acquires sound information. Subsequently, a motion determination unit 112-1 determines the motion of the user U-1 to acquire a motion determination result. A communication control unit 113-1 makes control such that the motion of the user U-1, the sound information, and the motion determination result are transmitted to the information processing apparatus 10-2 via the communication network 40.

At the information processing apparatus 10-2, a communication control unit 113-2 acquires the motion of the user U-1, the sound information, and the motion determination result received from the information processing apparatus 10-1 via the communication network 40. Furthermore, a reception determination unit 114-2 determines a reception state of the motion of the user U-1 by the communication control unit 113-2. Subsequently, a motion generation unit 115-2 generates a motion of the avatar 20-2, on the basis of the motion of the user U-1, a reception determination result, and motion determination result, and a motion control unit 116-2 controls the motion of the avatar 20-2. At the information processing apparatus 10-2, the sound information is also output.

Next, the overview of the data flow indicated by the broken line arrows in FIG. 4 will be described. At the information processing apparatus 10-2, a motion acquisition unit 111-2 recognizes the motion of the user U-2 from an image and acquires the motion of the user U-2. Furthermore, the motion acquisition unit 111-2 also acquires sound information. Subsequently, the motion determination unit 112-2 determines the motion of the user U-2 to acquire a motion determination result. The communication control unit 113-2 makes control such that the motion of the user U-2, the sound information, and the motion determination result are transmitted to the information processing apparatus 10-1 via the communication network 40.

At the information processing apparatus 10-1, the communication control unit 113-1 acquires the motion of the user U-2, the sound information, and the motion determination result received from the information processing apparatus 10-2 via the communication network 40. Furthermore, a reception determination unit 114-1 determines a reception state of the motion of the user U-2 by the communication control unit 113-1. Subsequently, a motion generation unit 115-1 generates a motion of the avatar 20-1, on the basis of the motion of the user U-2, a reception determination result, and the motion determination result, and a motion control unit 116-1 controls the motion of the avatar 20-1. At the information processing apparatus 10-1, the sound information is also output.

There have been described above the data flow in the processing from the recognition of the motion of the user U-1 to the control of the avatar 20-2 and the data flow in the processing from the recognition of the motion of the user U-2 to the control of the avatar 20-1. There will be mainly described below the data flow in the processing from the recognition of the motion of the user U-2 to the control of the avatar 20-1 as representative of both of the data flows.

At the information processing apparatus 10-1, when an abnormality of a signal input for controlling the motion of the avatar 20-1 responsive to the motion of the user U-2 is detected, the motion control unit 116-1 controls the motion of the avatar 20-1 such that the avatar 20-1 continues a predetermined motion until a normality of a signal input is detected. At this time, until the motion of the avatar 20-1 transitions to the predetermined motion after the abnormality is detected, the motion control unit 116-1 controls the avatar 20-1 such that the avatar 20-1 performs at least one first intermediate motion. The at least one first intermediate motion is different from the motion of the avatar 20-1 at the detection of the abnormality and the predetermined motion.

According to the configuration, the human-like motion of the avatar 20-1 can be enhanced. The details of the configuration will be described more specifically below. In the first embodiment of the present disclosure, there will be mainly described a case where the avatar 20-1 is controlled such that the avatar 20-1 performs one intermediate motion. The avatar 20-1, however, may be controlled such that the avatar 20-1 performs a plurality of intermediate motions.

In the first embodiment of the present disclosure, a case is mainly assumed in which the motion of the user U-2 is recognized at the information processing apparatus 10-2. In the case, the motion of the user U-2 is transmitted from the information processing apparatus 10-2 to the information processing apparatus 10-1. Thus, a signal for controlling the motion of the avatar 20-1 may be the motion of the user U-2.

However, a case is also assumed in which the motion of the user U-2 is recognized at the information processing apparatus 10-1. In the case, a captured image for recognizing the motion of the user U-2 is transmitted from the information processing apparatus 10-2 to the information processing apparatus 10-1. Thus, the signal for controlling the motion of the avatar 20-1 may be the captured image for recognizing the motion of the user U-2.

Furthermore, the abnormality of the signal input for controlling the motion of the avatar 20-1 may be detected in any case. As a first example, an abnormality may be detected when the motion of the user U-2 recognized from a captured image does not fall within a predetermined motion range.

Furthermore, as a second example, when the information processing apparatus 10-2 as an exemplary external apparatus generates a signal for controlling the motion of the avatar 20-1, the reception determination unit 114-1 at the information processing apparatus 10-1 may detect an abnormality of the signal input received from the information processing apparatus 10-2. For example, when a signal for controlling the motion of the avatar 20-1 is received from the information processing apparatus 10-2 as an exemplary external apparatus, the reception determination unit 114-1 at the information processing apparatus 10-1 may detect an abnormality when the reception state of the signal is a predetermined state.

More specifically, when a value for controlling the motion of the avatar 20-1, indicated by the signal for controlling the motion of the avatar 20-1 received from the information processing apparatus 10-2, indicates a successively identical value for a predetermined number of times or more, the reception determination unit 114-1 may detect an abnormality.

For example, when a captured image is not acquired at the information processing apparatus 10-2, when the motion of the user U-2 is unrecognized from a captured image, or the like, a successively identical signal may be transmitted from the information processing apparatus 10-2 to the information processing apparatus 10-1, as a signal for controlling the motion of the avatar 20-1. In the case, if the user U-2 is captured in the captured image, a signal for controlling the motion of the avatar 20-1 is considered to vary at least slightly. Thus, when a value for controlling the motion of the avatar 20-1, indicated by the signal for controlling the motion of the avatar 20-1 is successively identical for the predetermined number of times or more, the reception determination unit 114-1 may detect an abnormality.

Furthermore, for example, when a signal for controlling the motion of the avatar 20-1 is not received beyond a predetermined period of time, the reception determination unit 114-1 may detect an abnormality. Examples of the cases where the signal for controlling the motion of the avatar 20-1 is not received beyond the predetermined period of time that can be assumed include a case where a transmission delay in the signal for controlling the motion of the avatar 20-1 (for example, transmission delay at the communication network 40 or the like) does not occur, a case where the signal for controlling the motion of the avatar 20-1 does not reach the information processing apparatus 10-1, and the like.

Hereinafter, a case will be mainly described in which an abnormality is detected for even any one of the first example and the second example, and a normality is detected when neither the first example nor the second example is detected. However, it may be detected that whether or not only one of the first example and the second example is abnormal. In the case, when the abnormality in the first example is not detected, a normality may be detected. Alternatively, when the abnormality in the second example is not detected, a normality may be detected.

First, at the information processing apparatus 10-2, the motion acquisition unit 111-2 recognizes the motion of the user U-2 from the captured image and acquires the motion of the user U-2. When the body of the user U-2 is regarded as a "recognition target" and the parts of the body of the user U-2 are each regarded as a "recognition target part", the motion of the user U-2 may include the position and orientation of each of the recognition target parts. More specifically, examples of the recognition target parts may include an eye, the mouth, a hand, a foot, and the like. Furthermore, the position and orientation of each recognition target part may be represented by the position and rotation angle of each of the joints.

The motion determination unit 112-2 determines whether or not the motion of the user U-2 falls within the predetermined range. For example, the motion determination unit 112-2 determines whether or not the motion of the user U-2 falls within the predetermined range for each recognition target part. Here, the predetermined range is not particularly limited. For example, a range assumable as the motion of the user U-2 may be predefined as the predetermined range. The motion determination unit 112-2 detects an abnormality when the motion of the user U-2 does not fall within the predetermined range.

The communication control unit 113-2 makes control such that the motion of the user U-2, the sound information, and the determination result by the motion determination unit 112-2 are transmitted to the information processing apparatus 10-1 via the communication network 40. At the information processing apparatus 10-1, the communication control unit 113-1 acquires the motion of the user U-2, the sound information, and the motion determination result received from the information processing apparatus 10-1 via the communication network 40.

The reception determination unit 114-1 determines the reception state of the motion of the user U-2 by the communication control unit 113-1. For example, as described above, the reception determination unit 114-1 detects an abnormality when the reception state of the motion of the user U-2 is the predetermined state. Subsequently, the motion generation unit 115-1 generates a motion of the avatar 20-1, on the basis of the motion determination result by the motion determination unit 112-2, the reception determination result by the reception determination unit 114-1, and the motion of the user U-2, and the motion control unit 116-2 controls the motion of the avatar 20-1. At the information processing apparatus 10-1, the sound information is also output.

First, a case is assumed in which a normality of a signal input for controlling the motion of the avatar 20-1 is detected. More specifically, a case where the motion determination result by the motion determination unit 112-2 is normal and a case where the reception determination result by the reception determination unit 114-1 is normal are assumed. In the cases, the motion acquisition unit 116-1 controls the motion of the avatar 20-1, on the basis of the motion of the user U-2.

FIG. 5 is an illustration of an exemplary motion control of the avatar 20-1 when the normality of the signal input for controlling the motion of the avatar 20-1 is detected. Referring to FIG. 5, an avatar 20-4 as an example of the avatar 20-1 is displayed on the screen 161-1.

Here, cases assumed in which the motion determination result by the motion determination unit 112-2 is normal and the reception determination result by the reception determination unit 114-1 is normal. In the cases, the motion acquisition unit 116-1 controls the motion of the avatar 20-4 such that the motion of the avatar 20-4 corresponds to the motion of the user U-2. Referring to FIG. 5, there is displayed an avatar 20-5, due to recognition of the motion of the user U-2 with both hands raising, controlled such that the avatar 20-5 performs the motion of raising both hands according to the motion of the user U-2.

Next, a case is assumed in which an abnormality of a signal input for controlling the motion of the avatar 20-1 is detected. More specifically, a case where the motion determination result by the motion determination unit 112-2 is abnormal or a case where the reception determination result by the reception determination unit 114-1 is abnormal is assumed. In the cases, until the motion of the avatar 20-1 transitions to the predetermined motion after the abnormality is detected, the motion acquisition unit 116-1 controls the avatar 20-1 such that the avatar 20-1 performs at least one the first intermediate motion. The at least one first intermediate motion is different from the motion of the avatar 20-1 at the detection of the abnormality and the predetermined motion.

Here, various motions are assumed as the "predetermined motion", each of which is the transition destination of the motion of the avatar 20-1 when the abnormality is detected. For example, when an abnormality is detected beyond a first period of time (hereinafter, also referred to as "period of time T1"), the motion control unit 116-1 may allow the motion of the control target part of the avatar 20-1 corresponding to a first recognition target part of the user U-2 associated with the abnormality, to transition to a first motion included in the predetermined motion.

The first motion is not particularly limited. In the first embodiment of the present disclosure, in order to make the avatar 20-1 look like a human, a case will be mainly described in which, as the first motion, a swing-like motion of a control target part is used.

Figure 6:
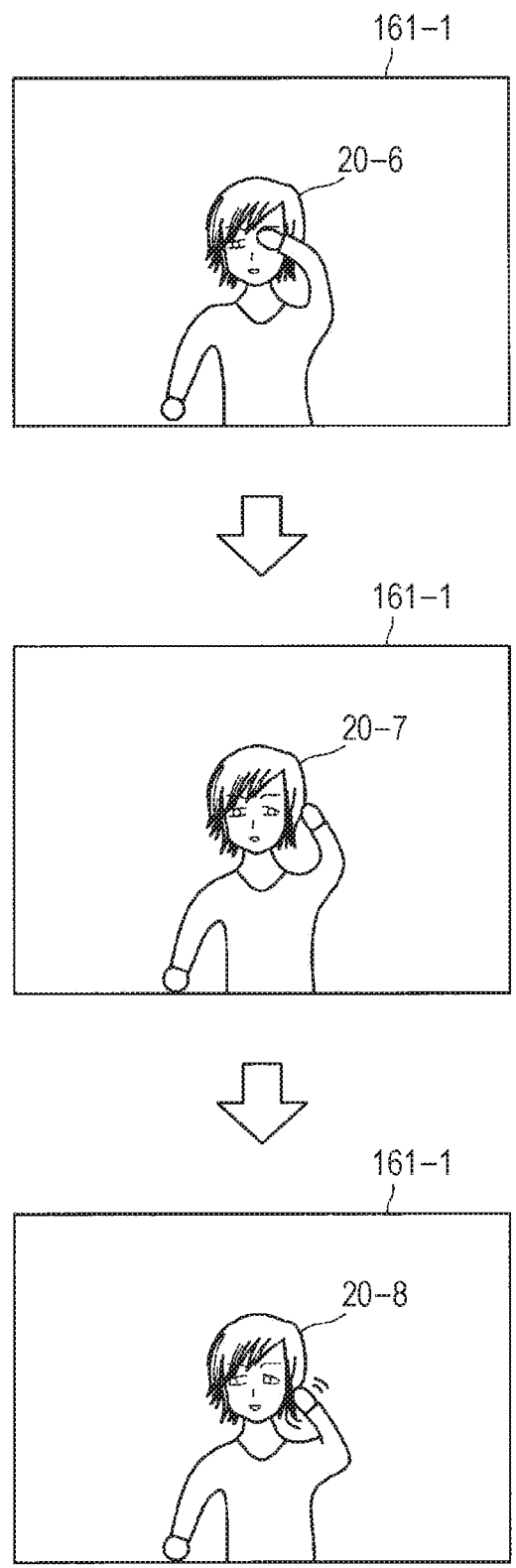
FIG. 6 is an illustration of an exemplary motion control of the avatar when an abnormality is detected beyond a first period of time.

FIG. 6 is an illustration of an exemplary motion control of the avatar 20-1 when the abnormality is detected beyond the period of time T1. Referring to FIG. 6, an avatar 20-6 as an example of the avatar 20-1 is displayed on the screen 161-1. The user U-2, however, positions the hand of the user U-2 in front of the face, so that the avatar 20-6 also positions a hand of the avatar 20-6 in front of the face.

Here, a case is assumed in which an abnormality of non-detection of the hand of the user U-2 is detected beyond the period of time T1. In the case, the motion acquisition unit 116-1 allows the motion of the control target part "hand of the avatar 20-6" corresponding to the first recognition target part "hand of the user U-2" where the abnormality is detected, to transition to the first motion "swing-like motion". Referring to FIG. 6, there is displayed an avatar 20-8 after the transition to the swing-like motion of the hand.

At this time, the motion acquisition unit 116-1 may allow the motion of the control target part "hand of the avatar 20-6" to transition to the first motion "swing-like motion", on the basis of the position, in the captured image, of the first recognition target part "hand of the user U-2" where the abnormality is detected. In the example illustrated in FIG. 6, the abnormality of the first recognition target part "hand of the user U-2" is detected at the position of the face of the user U-2. Therefore, the motion acquisition unit 116-1 positions the control target part "hand of the avatar 20-8" at a position away from the position of the face.

Furthermore, until the motion of the avatar 20-6 transitions to the avatar 20-8 (i.e., until transition to the first motion "swing-like motion" after the detection of the abnormality), the motion acquisition unit 116-1 controls the avatar 20-6 such that the avatar 20-6 performs at least one the first intermediate motion. The at least one first intermediate motion is different from the motion of the avatar 20-1 at the detection of the abnormality and the predetermined motion. Referring to FIG. 6, there is displayed an avatar 20-7 with the hand of the avatar 20-7 controlled so as to be intermediate in position between the respective hands of the avatar 20-6 and the avatar 20-8, and with the direction of the hand of the avatar 20-7 controlled so as to be intermediate in direction between the respective hands of the avatar 20-6 and the avatar 20-8.

Note that the first motion may be determined independently from the user U-2, or may be determined dependently on the user U-2. For example, a case is also assumed in which the first motion and the motion of a second recognition target part are associated with each other in advance, corresponding to the user U-2. In the case, when an abnormality is detected beyond the first period of time and when the motion of the second recognition target part of the user U-2 is recognized, the motion of the control target part may be allowed to transition to the first motion.

At this time, the first motion of the control target part of the user U-2 and the motion of the second recognition target part are associated with each other in advance. For example, for recognition of the first motion of the control target part and the motion of the second recognition target part from a single captured image, the motion generation unit 115-1 is only required to associate the motion of the control target part with the motion of the second recognition target part.

As an example, a case is assumed in which the user U-2 has a habit of simultaneously lowering a hand and turning an eye of the user U-2 upward and thus the first motion "motion of lowering the hand" of the control target part "hand" and "motion of turning upward" of the motion of the second recognition target part "eye" are associated with each other, corresponding to the user U-2.

In the case, even when the first recognition target part "hand" is not recognized from the captured image of the user U-2, when the "motion of turning upward" of the motion of the second recognition target part "eye" is recognized, the motion of the control target part "hand" transitions to the first motion "motion of lowering the hand". Therefore, the habit of the user U-2 can be reflected in the movement of the control target part.

Next, a case is assumed in which an abnormality is detected beyond a second period of time (hereinafter also referred to as "period of time T2") longer than the period of time T1. In the case, for example, the motion control unit 116-1 may allow the entirety of the motion of the avatar 20-1 to transition to a second motion included in the predetermined motion. Hereinafter, the second motion may be referred to as "standard state".

The second motion (standard state) is not particularly limited. In the first embodiment of the present disclosure, in order to make the avatar 20-1 look like a human, a case will be mainly described in which, as the second motion (standard state), the motions of blinking the eyes and shaking the shoulders left and right are used.

FIG. 7 is an illustration of an exemplary motion control of the avatar 20-1 when the abnormality is detected beyond the period of time T2. Referring to FIG. 7, an avatar 20-9 as an example of the avatar 20-1 is displayed on the screen 161-1. Specifically, the abnormality is beyond the period of time T1, and the motion of a control target part "hand of the avatar 20-9" corresponding to the recognition target part "hand of the user U-2" where the abnormality is detected has transitioned to the first motion "swing-like motion".

Here, a case is assumed in which an abnormality of non-detection of the hand of the user U-2 is detected beyond the period of time T2. In the case, the motion acquisition unit 116-1 allows the entirety of the motion of the avatar 20-9 to transition to the second motion (standard state) "blinking the eyes and shaking the upper body left and right". Referring to FIG. 7, there are displayed avatars 20-11 and 20-12 after the transition to the motions of blinking the eyes and shaking the upper body left and right.

At this time, the motion acquisition unit 116-1 may allow the entirety of the motion of the avatar 20-9 to transition to the second motion (standard state) "blinking the eyes and shaking the upper body left and right", on the basis of the position, in the captured image, of the recognition target "user U-2" where the abnormality is detected. In the example illustrated in FIG. 7, an abnormality of the recognition target "user U-2" is detected in the center of the captured image. Therefore, the motion acquisition unit 116-1 positions each of the control targets "avatars 20-11 and 20-12" at the center of the screen 161-1.

Furthermore, until the motion of the avatar 20-9 transitions to the avatars 20-11 and 20-12 (i.e., until transition to the second motion (standard state) "blinking the eyes and shaking the upper body left and right" after the detection of the abnormality), the motion acquisition unit 116-1 controls the avatar 20-9 such that the avatar 20-9 performs at least one first intermediate motion. The at least one first intermediate motion is different from the motion of the avatar 20-9 at the detection of the abnormality and the predetermined motion. Referring to FIG. 7, there is displayed an avatar 20-10 with the hand of the avatar 20-10 controlled so as to be intermediate in position between the hand of the avatar 20-9 and the respective hands of avatars 20-11 and 20-12, and with the hand of the avatar 20-10 controlled so as to be intermediate in direction between the hand of the avatar 20-9 and the respective hands of the avatars 20-11 and 20-12.

Note that, there has been mainly described above the case where one motion is used as the second motion (standard state); however a plurality of motions may be used as the second motion (standard state). In other words, when the second motion (standard state) includes the plurality of motions different mutually and an abnormality is detected beyond the period of time T2, the motion acquisition unit 116-1 may make control of the entirety of the motion of the avatar 20-9 such that the entirety of the motion of the avatar 20-9 is switchable between the plurality of motions (for example, every predetermined period of time). The avatars 20-11 and 20-12 are then expected to look more like humans, respectively.

Furthermore, the second motion (standard state) may be selected from the plurality of motions. In other words, when an abnormality is detected beyond the period of time T2, the motion acquisition unit 116-1 may select the second motion (standard state) from the plurality of motions on the basis of the motion of the user U-2 where the abnormality is detected (for example, select a motion closest to the motion of the user U-2 where the abnormality is detected), and may allow the entirety of the motion of the avatar 20-9 to transition to the selected second motion (standard state).

Note that the second motion (standard state) may be determined independently from the user U-2, or may be determined dependently on the user U-2. For example, when the action state of the user U-2 satisfies predetermined conditions, the motion generation unit 115-1 may generate a second motion (standard state) on the basis of the action state of the user U-2. This makes it possible to reflect the habit of the user U-2 in the second motion (standard state). The action state of the user U-2 may include the movement of the user U-2, or may include the amount of speech of the user U-2.

Here, the predetermined conditions are not particularly limited. For example, it is likely that generation of a second motion based on the motion of the user U-2 who is less active than generation of a second motion based on the motion of the user U-2 who is more active results in generation of a more appropriate standard state. Therefore, the predetermined conditions may include at least one of a condition that the amount of speech of the user U-2 is smaller than a predetermined amount or a condition that the movement of the user U-2 is smaller than predetermined movement.

There has been mainly described above the motion of the avatar 20-1 when the abnormality of the signal input for controlling the motion of the avatar 20-1 is detected. However, a case is also assumed in which a normality is detected again after the abnormality is detected once. More specifically, a case where a motion determination result by the motion determination unit 112-2 is normal and a case where a reception determination result by the reception determination unit 114-1 is normal are assumed. Even in the cases, the motion of the avatar 20-1 is preferably controlled so as to gradually return from the motion at the detection of the abnormality to the motion at the detection of the normality. The avatar 20-1 is then expected to look more like a human.

In other words, when the normality of the signal input for controlling the motion of the avatar 20-1 is detected after the abnormality of the signal input for controlling the motion of the avatar 20-1 is detected, until the motion control unit 116-1 allows the motion of the avatar 20-1 to transition from the predetermined motion so as to be on the basis of the motion of the user U-2, the motion control unit 116-1 may make control of the motion of the avatar 20-1 such that the avatar 20-1 performs at least one second intermediate motion that is different from the predetermined motion.

Figure 8:
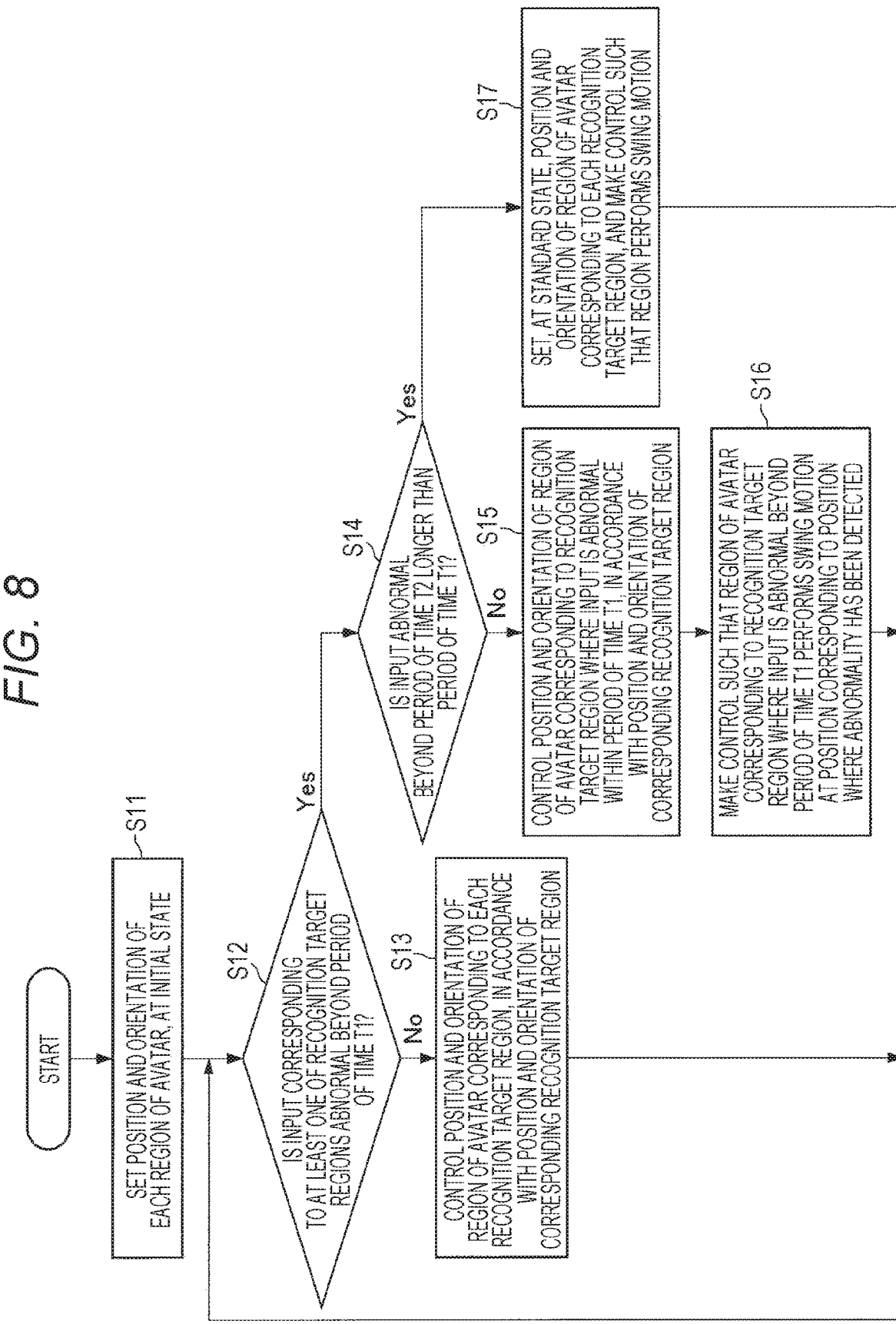
FIG. 8 is a flowchart of an exemplary operation of a motion control unit in the information processing apparatus according to the first embodiment of the present disclosure.

FIG. 8 is a flowchart of an exemplary operation of the motion control unit 116-1 in the information processing apparatus 10-1. As illustrated in FIG. 8, first, the motion control unit 116-1 sets the position and orientation of each part of the avatar, at the initial state (S11).

Subsequently, when a condition where an input corresponding to at least one of recognition target parts is abnormal beyond the period of time T1 is not satisfied ("No" in S12), the motion control unit 116-1 controls the position and orientation of the part of the avatar corresponding to each recognition target part, in accordance with the position and orientation of the corresponding recognition target part (S13). Then, the motion control unit 116-1 shifts the operation to S12.

In contrast, when the condition where the input corresponding to at least one of the recognition target parts is abnormal beyond the period of time T1 is satisfied ("Yes" in S12), the motion control unit 116-1 determines whether or not a condition where the input is abnormal beyond the period of time T2 longer than the period of time T1 is satisfied (S14).

When the condition where the input is abnormal beyond the longer period of time T2 is not satisfied ("No" in S14), the motion control unit 116-1 controls the position and orientation of the part of the avatar corresponding to a recognition target part where the input is abnormal within the period of time T1, in accordance with the position and orientation of the corresponding recognition target part (S15). Then, the motion control unit 116-1 makes control such that the part of the avatar corresponding to a recognition target part where the input is abnormal beyond the period of time T1 performs a swing motion at a position corresponding to the position where the abnormality has been detected (S16). Then, the motion control unit 116-1 shifts the operation to S12.

In contrast, when the condition where the input is abnormal beyond the longer period of time T2 is satisfied ("Yes" in S14), the motion control unit 116-1 sets, at the standard state, the position and orientation of the part of the avatar corresponding to each recognition target part, and makes control such that the part performs a swing motion (S17). Then, the motion control unit 116-1 shifts the operation to S12.

The first embodiment of the present disclosure has been described above.

2. SECOND EMBODIMENT

First, a second embodiment of the present disclosure will be described.

2.1. Exemplary Configuration of System

Figure 9:
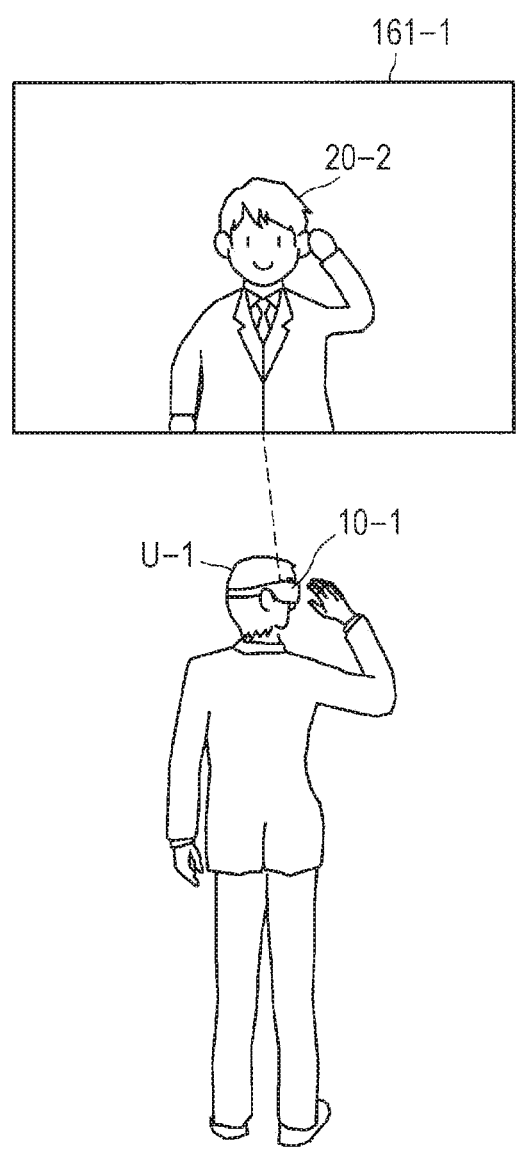
FIG. 9 is an illustration of an exemplary configuration of an information processing system according to a second embodiment of the present disclosure.

First, an exemplary configuration of an information processing system according to the second embodiment of the present disclosure will be described. FIG. 9 is an illustration of the exemplary configuration of the information processing system according to the second embodiment of the present disclosure. As illustrated in FIG. 9, the information processing system according to the second embodiment of the present disclosure includes an information processing apparatus 10-1. The information processing apparatus 10-1 is used by a user U-1. According to the second embodiment of the present disclosure, unlike the first embodiment of the present disclosure, the information processing system need not include an information processing apparatus 10-2.

In the example illustrated in FIG. 9, an avatar 20-2 as an exemplary virtual object is displayed on a screen 161-1 of the information processing apparatus 10-1. An avatar 20-1 is displayed. According to the second embodiment of the present disclosure, unlike the first embodiment of the present disclosure, the information processing apparatus 10-1 controls the motion of the avatar 20-2, on the basis of the motion of the user U-1. The user U-1 can see the avatar 20-2 controlled on the basis of the motion of the user U-1.

The exemplary configuration of the information processing system according to the second embodiment of the present disclosure has been described above.

2.2. Exemplary Functional Configuration of Information Processing Apparatus

Figure 10:
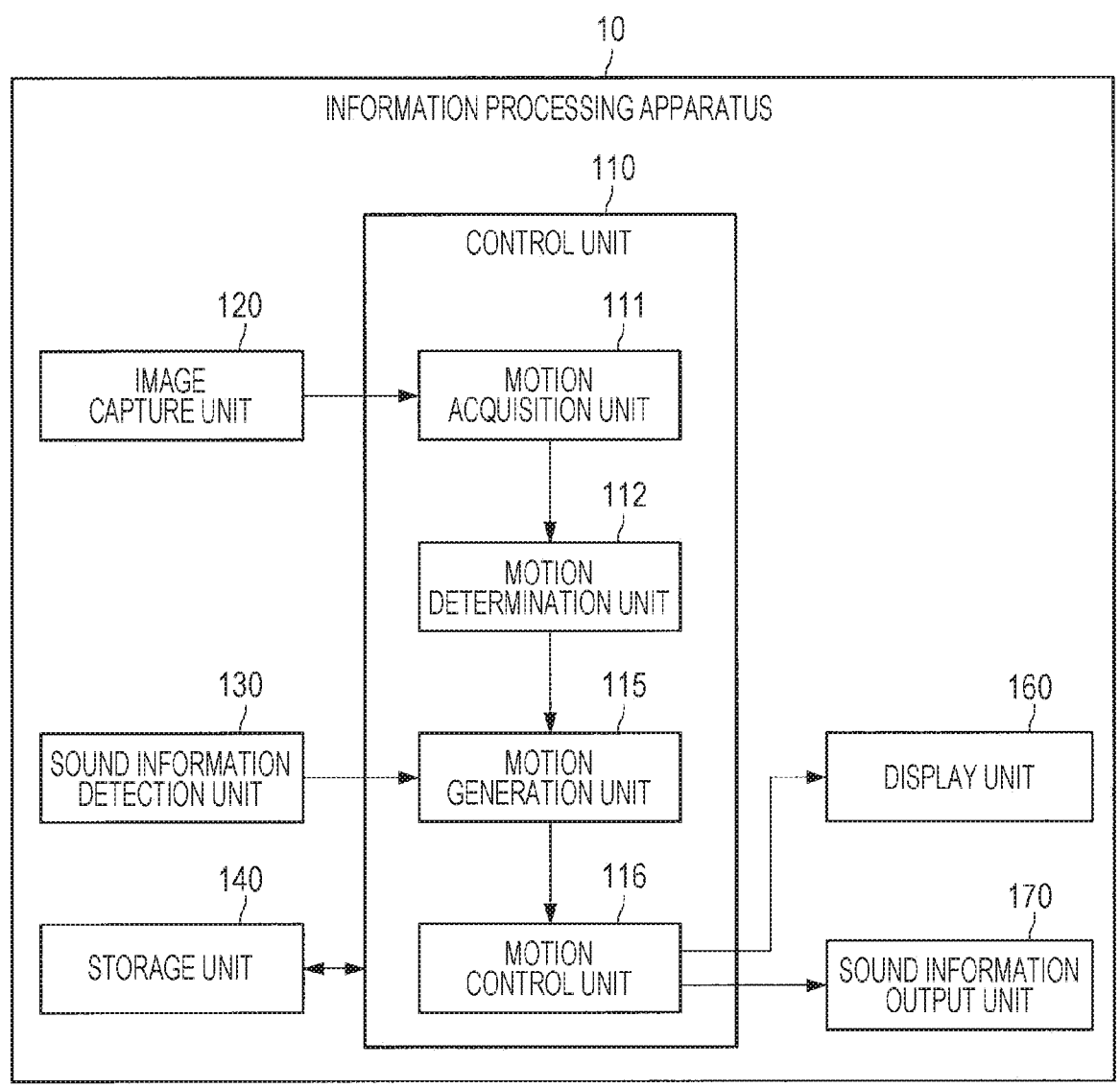
FIG. 10 is a diagram of an exemplary functional configuration of an information processing apparatus according to the second embodiment of the present disclosure.

Next, an exemplary functional configuration of an information processing apparatus 10 according to the second embodiment of the present disclosure will be described. FIG. 10 is a diagram of the exemplary functional configuration of the information processing apparatus 10 according to the second embodiment of the present disclosure. As illustrated in FIG. 10, unlike the information processing apparatus 10 according to the second embodiment of the present disclosure, the information processing apparatus 10 according to the second embodiment of the present disclosure, does not include a communication unit 150, and need not include a communication control unit 113 and a reception determination unit 114.

The exemplary functional configuration of the information processing apparatus 10 according to the second embodiment of the present disclosure has been described above.

2.3. Functional Details of Information Processing System

Next, the functional details of the information processing system according to the second embodiment of the present disclosure will be described. As illustrated in FIG. 10, at the information processing apparatus 10-1 according to the second embodiment of the present disclosure, the motion of the user U-1 acquired by a motion acquisition unit 111 and a motion determination result of the user U-1 determined by a motion determination unit 112 are output to a motion generation unit 115 and a motion control unit 116 of the same information processing apparatus 10-1.

Therefore, the processing performed by the motion generation unit 115 of the other information processing apparatus 10-2 in the first embodiment of the present disclosure is performed by the motion generation unit 115 of the information processing apparatus 10-1 in the second embodiment of the present disclosure. Similarly, the processing performed by the motion control unit 116 of the other information processing apparatus 10-2 in the first embodiment of the present disclosure is performed by the motion control unit 116 of the information processing apparatus 10-1 in the second embodiment of the present disclosure.

The second embodiment of the present disclosure has been described above.

3. THIRD EMBODIMENT

First, a third embodiment of the present disclosure will be described.

[3.1. Exemplary Configuration of System]

Figure 11:
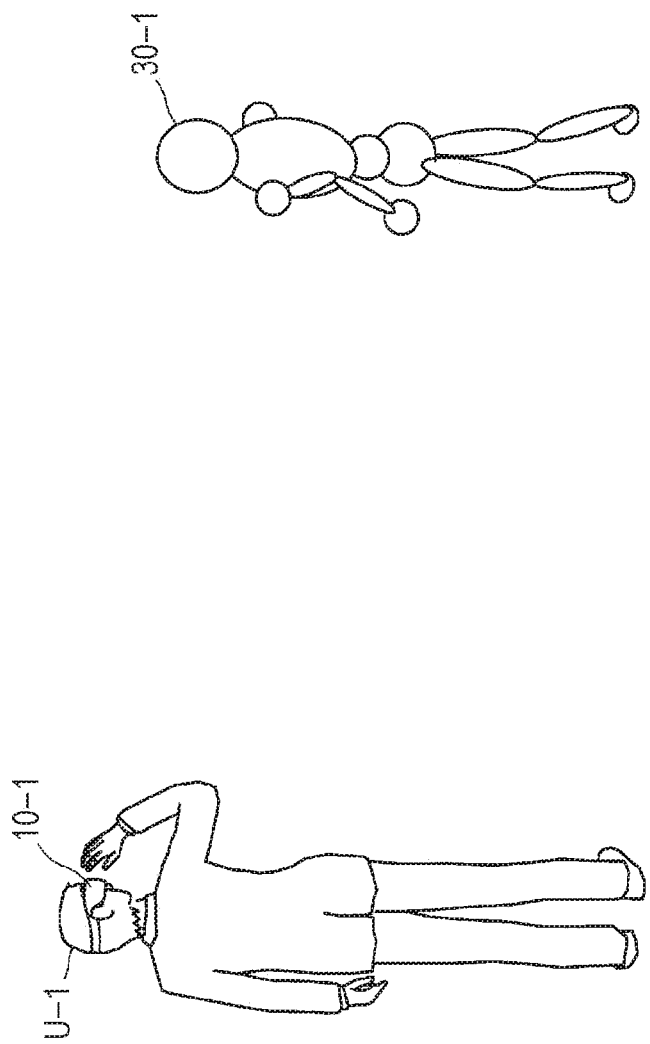
FIG. 11 is an illustration of an exemplary configuration of an information processing system according to a third embodiment of the present disclosure.

First, an exemplary configuration of an information processing system according to the third embodiment of the present disclosure will be described. FIG. 11 is an illustration of the exemplary configuration of the information processing system according to the third embodiment of the present disclosure. As illustrated in FIG. 11, the information processing system according to the third embodiment of the present disclosure includes an information processing apparatus 10-1 and a robot 30-1. The information processing apparatus 10-1 is used by a user U-1. According to the third embodiment of the present disclosure, unlike the first embodiment of the present disclosure, the information processing system need not include an information processing apparatus 10-2.

In the example illustrated in FIG. 11, the robot 30-1 exists as an exemplary real object. Here, the real object is not limited to the robot 30-1. For example, the real object may be an agent or the like. The information processing apparatus 10-1 controls the motion of the robot 30-1 on the basis of the motion of the user U-1. The user U-1 can see the robot 30-1 controlled on the basis of the motion of the user U-1.

The exemplary configuration of the information processing system according to the third embodiment of the present disclosure has been described above.

3.2. Exemplary Functional Configuration of Information Processing Apparatus

Figure 12:
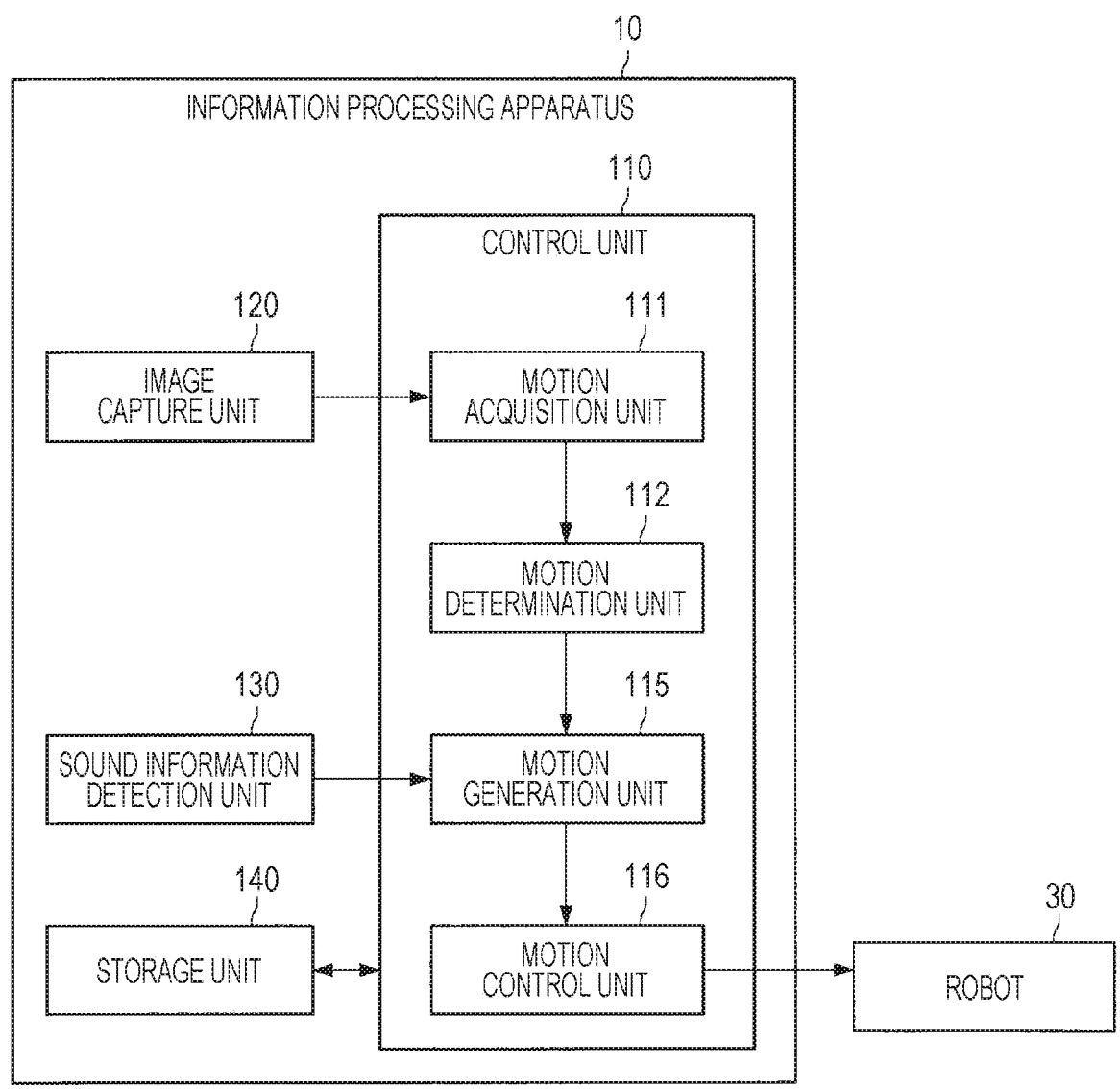
FIG. 12 is a diagram of an exemplary functional configuration of an information processing apparatus according to the third embodiment of the present disclosure.

Next, an exemplary functional configuration of an information processing apparatus 10 according to the third embodiment of the present disclosure will be described. FIG. 12 is a diagram of the exemplary functional configuration of the information processing apparatus 10 according to the third embodiment of the present disclosure. As illustrated in FIG. 12, unlike the information processing apparatus 10 according to the second embodiment of the present disclosure, the information processing apparatus 10 according to the third embodiment of the present disclosure, does not include a display unit 160 and a sound information output unit 170, and a motion control signal and sound information are output to the robot 30.

The exemplary functional configuration of the information processing apparatus 10 according to the third embodiment of the present disclosure has been described above.

3.3. Functional Details of Information Processing System

Next, the functional details of the information processing system according to the third embodiment of the present disclosure will be described. As illustrated in FIG. 12, at the information processing apparatus 10-1 according to the third embodiment of the present disclosure, the motion of the user U-1 acquired by a motion acquisition unit 111, and a motion determination result of the user U-1 determined by a motion determination unit 112 are output to a motion generation unit 115 and a motion control unit 116 of the same information processing apparatus 10-1.

Therefore, the processing performed by the motion generation unit 115 of the other information processing apparatus 10-2 in the first embodiment of the present disclosure is performed by the motion generation unit 115 of the information processing apparatus 10-1 in the third embodiment of the present disclosure. Similarly, the processing performed by the motion control unit 116 of the other information processing apparatus 10-2 in the first embodiment of the present disclosure is performed by the motion control unit 116 of the information processing apparatus 10-1 in the third embodiment of the present disclosure.

Figure 13:
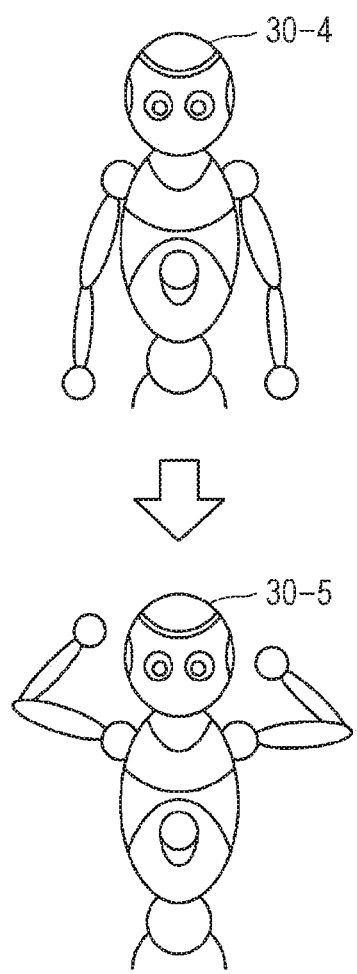
FIG. 13 is an illustration of an exemplary motion control of a robot when a normality of a signal input for controlling the motion of a robot is detected.

FIG. 13 is an illustration of an exemplary motion control of the robot 30-1 when a normality of a signal input for controlling the motion of the robot 30-1 is detected. Referring to FIG. 13, a robot 30-4 exists as an example of the robot 30-1.

Here, a case where the motion determination result by the motion determination unit 112 is normal and a case where a reception determination result by a reception determination unit 114 is normal are assumed. In the cases, the motion acquisition unit 116 controls the motion of the robot 30-4 such that the motion of the robot 30-4 corresponds to the motion of the user U-1. Referring to FIG. 13, there exists a robot 30-5, due to recognition of the motion of the user U-1 with both hands raising, controlled such that the robot 30-5 performs the motion of raising both hands according to the motion of the user U-1.

Next, a case is assumed in which an abnormality of a signal input for controlling the motion of the robot 30-1 is detected. More specifically, a case where the motion determination result by the motion determination unit 112 is abnormal or a case where the reception determination result by the reception determination unit 114 is abnormal is assumed. In the case, until the motion of the robot 30-1 transitions to the predetermined motion after the abnormality is detected, the motion acquisition unit 116 controls the robot 30-1 such that the robot 30-1 performs at least one first intermediate motion. The at least one first intermediate motion is different from the motion of the robot 30-1 at the detection of the abnormality and a predetermined motion.

For example, similarly to the first embodiment of the present disclosure, when an abnormality is detected beyond a period of time T1, the motion control unit 116 may allow the motion of the control target part of the robot 30-1 corresponding to a first recognition target part of the robot 30-1 associated with the abnormality, to transition to a first motion included in the predetermined motion. The first motion is not particularly limited similarly to the first embodiment of the present disclosure.

FIG. 14 is an illustration of an exemplary motion control of the robot 30-1 when the abnormality is detected beyond the period of time T1. Referring to FIG. 14, a robot 30-6 exists as an example of the robot 30-1. The user U-1, however, positions a hand of the user U-1 in front of the face, so that the robot 30-6 also positions a hand of the robot 30-6 in front of the face.

Here, a case is assumed in which an abnormality of non-detection of the hand of the user U-1 is detected beyond the period of time T1. In the case, the motion acquisition unit 116 allows the motion of a control target part "hand of the robot 30-6" corresponding to a first recognition target part "hand of the user U-1" where the abnormality is detected, to transition to the first motion "swing-like motion". Referring to FIG. 14, there exists a robot 30-8 after the transition to the swing-like motion of the hand.

At this time, the motion acquisition unit 116 may allow the motion of the control target part "hand of the robot 30-6" to transition to the first motion "swing-like motion", on the basis of the position, in a captured image, of the first recognition target part "hand of user U-1" where the abnormality is detected. In the example illustrated in FIG. 14, the abnormality of the first recognition target part "hand of the user U-1" is detected at the position of the face of the user U-1. Therefore, the motion acquisition unit 116 positions the control target part "hand of the robot 30-8" at a position away from the position of the face.

Furthermore, until the motion of the robot 30-6 transitions to the robot 30-8 (i.e., until transition to the first motion "swing-like motion" after the detection of the abnormality), the motion acquisition unit 116 controls the robot 30-6 such that the robot 30-6 performs at least one first intermediate motion. The at least one first intermediate motion is different from the motion of the robot 30-1 at the detection of the abnormality and the predetermined motion. Referring to FIG. 14, there exists a robot 30-7 with the hand of the robot 30-7 controlled so as to be intermediate in position between the hand of the robot 30-6 and the hand of the robot 30-8, and with the hand of robot 30-7 controlled so as to be intermediate in direction between the respective hands of the robot 30-6 and the robot 30-8.

Next, it is assumed that an abnormality is detected beyond a period of time T2. In the case, for example, the motion control unit 116-1 may allow the entirety of the motion of the robot 30-1 to transition to a second motion (standard state) included in the predetermined motion. The second motion (standard state) is not particularly limited similarly to the first embodiment of the present disclosure.

Figure 15:
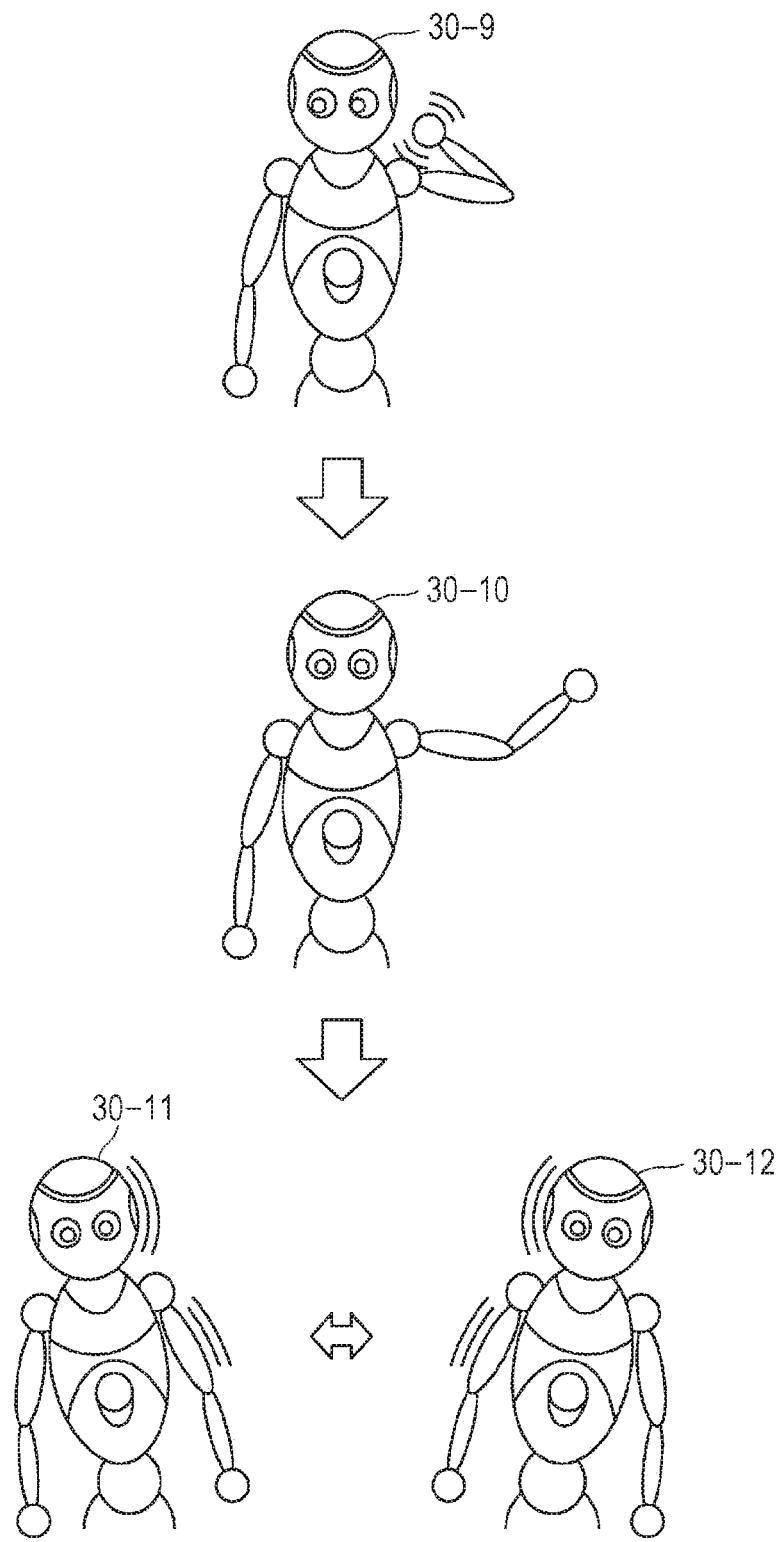
FIG. 15 is an illustration of an exemplary motion control of the robot when the abnormality is detected beyond a second period of time.

FIG. 15 is an illustration of an exemplary motion control of the robot 30-1 when the abnormality is detected beyond the period of time T2. Referring to FIG. 15, a robot 30-9 exists as an example of the robot 30-1. Specifically, the abnormality is beyond the period of time T1, and the motion of a control target part "hand of the robot 30-9" corresponding to the recognition target part "hand of the user U-1" where the abnormality is detected has transitioned to the first motion "swing-like motion".

Here, a case is assumed in which an abnormality of non-detection of the hand of the user U-1 is detected beyond the period of time T2. In the case, the motion acquisition unit 116-1 allows the entirety of the motion of the robot 30-9 to transition to the second motion (standard state) "blinking the eyes and shaking the upper body left and right". Referring to FIG. 15, there are displayed robots 30-11 and 30-12 after the transition to the motions of blinking the eyes and shaking the upper body left and right At this time, the motion acquisition unit 116 may allow the entirety of the motion of the robot 30-9 to transition to the second motion (standard state) "blinking the eyes and shaking the upper body left and right", on the basis of the position, in the captured image, of the recognition target "user U-1" where the abnormality is detected. For example, when the abnormality of the recognition target "user U-1" is detected at the center of the captured image, the motion acquisition unit 116 may position each of control targets "robots 30-11 and 30-12" at a position corresponding to the center of the captured image.

Furthermore, until the motion of the robot 30-9 transitions to the robots 30-11 and 30-12 (i.e., until from the detection of the abnormality to transition to the second motion (standard state) "blinking the eyes and shaking the upper body left and right"), the motion acquisition unit 116 controls the robot 30-9 such that the robot 30-9 performs at least one first intermediate motion. The at least one first intermediate motion is different from the motion of the robot 30-9 at the detection of the abnormality and the predetermined motion. Referring to FIG. 15, there exists a robot 30-10 with the hand of the robot 30-10 controlled so as to be intermediate in position between the hand of the robot 30-9 and the respective hands of the robots 30-11 and 30-12, and with the hand of the robot 30-10 controlled so as to be intermediate in direction between the hand of the robot 30-9 and the respective hands of the robots 30-11 and 30-12.

Figure 16:
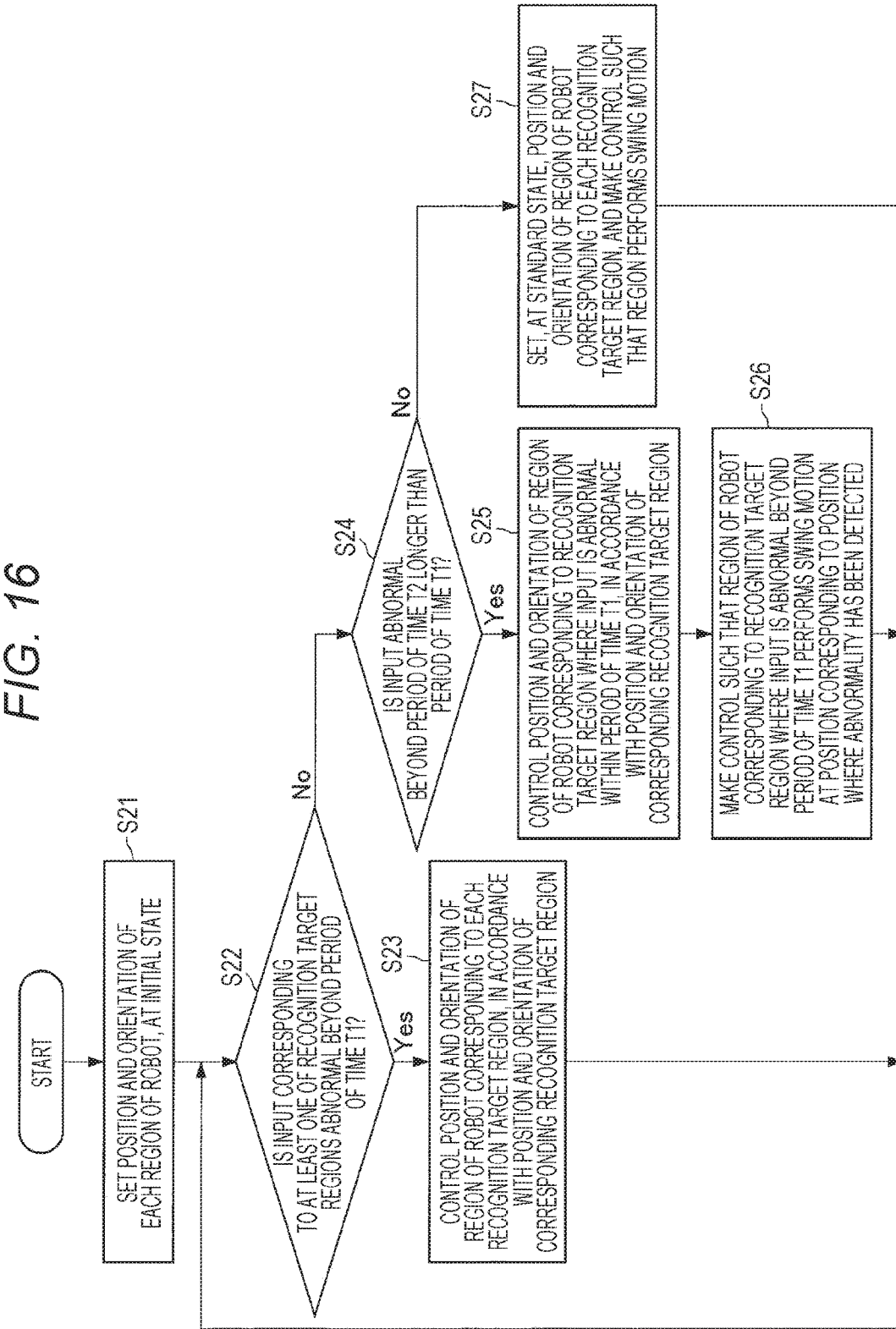
FIG. 16 is a flowchart of an exemplary operation of a motion control unit in the information processing apparatus according to the third embodiment of the present disclosure.

FIG. 16 is a flowchart of an exemplary operation of the motion control unit 116 in the information processing apparatus 10-1. As illustrated in FIG. 16, first, the motion control unit 116 sets the position and orientation of each part of the robot, at the initial state (S21).

Subsequently, when a condition where an input corresponding to at least one of recognition target parts is abnormal beyond the period of time T1 is not satisfied ("No" in S22), the motion control unit 116 controls the position and orientation of the part of the robot corresponding to each recognition target part, in accordance with the position and orientation of the corresponding recognition target part (S23). Then, the motion control unit 116 shifts the operation to S22.

In contrast, when the condition where the input corresponding to at least one of the recognition target parts is abnormal beyond the period of time T1 is satisfied ("Yes" in S22), the motion control unit 116 determines whether or not a condition where the abnormality is beyond the period of time T2 longer than the period of time T1 is satisfied (S24).

When the condition where the input is abnormal beyond the longer period of time T2 is not satisfied ("No" in S24), the motion control unit 116 controls the position and orientation of the part of the robot corresponding to a recognition target part where the input is abnormal within the period of time T1, in accordance with the position and orientation of the corresponding recognition target part (S25). Then, the motion control unit 116 makes control such that the part of the robot corresponding to a recognition target part where the input is abnormal beyond the period of time T1 performs a swing motion at a position corresponding to the position where the abnormality has been detected (S26). Then, the motion control unit 116 shifts the operation to S22.

In contrast, when the condition where the input is abnormal beyond the longer period of time T2 is satisfied ("Yes" in S24), the motion control unit 116 sets, at the standard state, the position and orientation of the part of the robot corresponding to each recognition target part, and makes control such that the part performs a swing motion (S27). Then, the motion control unit 116 shifts the operation to S22.

The third embodiment of the present disclosure has been described above.

4. EXEMPLARY HARDWARE CONFIGURATION

Figure 17:
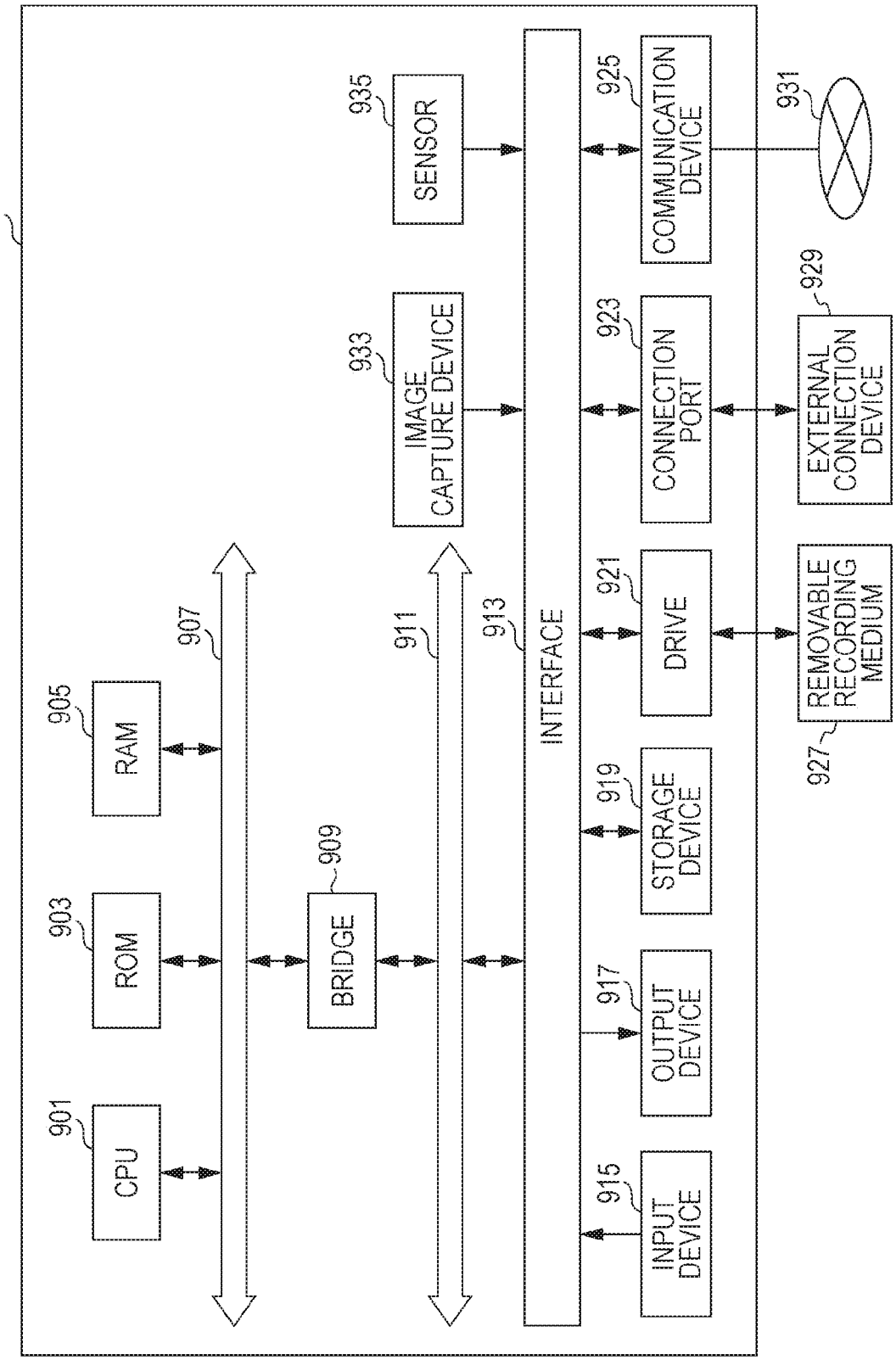
FIG. 17 is a block diagram of an exemplary hardware configuration of the information processing apparatus.

Next, an exemplary hardware configuration of the information processing apparatus 10 according to the embodiments of the present disclosure will be described with reference to FIG. 17. FIG. 17 is a block diagram of the exemplary hardware configuration of the information processing apparatus 10 according to the embodiments of the present disclosure.

As illustrated in FIG. 17, the information processing apparatus 10 includes a central processing unit (CPU) 901, a read only memory (ROM) 903, and a random access memory (RAM) 905. Furthermore, the information processing apparatus 10 may also include a host bus 907, a bridge 909, an external bus 911, an interface 913, an input device 915, an output device 917, a storage device 919, a drive 921, a connection port 923, and a communication device 925. Moreover, the information processing apparatus 10 may also include an image capture device 933 and a sensor 935, as required. The information processing apparatus 10 may have a processing circuit that can be called a digital signal processor (DSP) or an application specific integrated circuit (ASIC), instead of or in addition to the CPU 901.

The CPU 901 functions as an arithmetic processing device and a control device, and controls the overall or part operation in the information processing apparatus 10, in accordance with various programs recorded in the ROM 903, the RAM 905, the storage device 919, or a removable recording medium 927. The ROM 903 stores a program, arithmetic parameters, and the like, to be used by the CPU 901. The RAM 905 temporarily stores a program to be used in execution by the CPU 901, parameters to be appropriately changed in the execution by the CPU 901, and the like. The CPU 901, the ROM 903, and the RAM 905 are mutually connected though the host bus 907 including an internal bus such as a CPU bus. Moreover, the host bus 907 is connected to the external bus 911 such as a peripheral component interconnect/interface (PCI) bus via the bridge 909.

The input device 915 is a device to be operated by the user, such as a mouse, a keyboard, a touch panel, a button, a switch, and a lever. The input device 915 may include a microphone that detects the voice of the user. The input device 915 may be, for example, a remote control device using infrared rays or other radio waves, or an external connection device 929 such as a mobile phone in response to the operation of the information processing apparatus 10. The input device 915 includes an input control circuit that generates an input signal on the basis of information input by the user and outputs the input signal to the CPU 901. The user operates the input device 915 to input various types of data into the information processing apparatus 10 and instruct the information processing apparatus 10 on processing operation. Furthermore, an image capture device 933 as described later can also function as an input device by capturing the movement of a hand of the user, a finger of the user, or the like. At this time, the pointing position may be determined in accordance with the movement of the hand or the direction of the finger.

The output device 917 includes a device capable of visually or aurally notifying the user of acquired information. The output device 917 may be, for example, a display device such as a liquid crystal display (LCD), a plasma display panel (PDP), an organic EL display, and a projector; a hologram display device; a sound output device such as a speaker and a headphone; a printer device, and the like. The output device 917 outputs a result acquired by the processing of the information processing apparatus 10, as video such as text or an image or as sound such as voice or audio. Furthermore, the output device 917 may also include a light or the like for brightening the surroundings.

The storage device 919 is a data storage device, as an exemplary storage unit included in the information processing apparatus 10. The storage device 919 includes, for example, a magnetic storage unit device such as a hard disk drive (HDD), a semiconductor storage device, an optical storage device, a magneto-optical storage device, or the like. The storage device 919 stores the program to be executed by the CPU 901, various types of data, various types of data acquired externally, and the like.

The drive 921 serves as a reader/writer for a removable recording medium 927 such as a magnetic disk, an optical disk, a magneto-optical disk, or a semiconductor memory, and is incorporated in or externally attached to the information processing apparatus 10. The drive 921 reads information recorded in the attached removable recording medium 927 and outputs the read information to the RAM 905. Furthermore, the drive 921 writes a record on the removable recording medium 927 mounted thereto.

The connection port 923 is a port for directly connecting a device to the information processing apparatus 10. The connection port 923 may be, for example, a universal serial bus (USB) port, an IEEE 1394 port, a small computer system interface (SCSI) port, or the like. Furthermore, the connection port 923 may be an RS-232C port, an optical audio terminal, a high-definition multimedia interface (HDMI) (registered trademark) port, or the like. Connecting the external connection device 929 to the connection port 923 may allow exchange of various types of data between the information processing apparatus 10 and the external connection device 929.

The communication device 925 is, for example, a communication interface including a communication device or the like for connecting to a communication network 931. The communication device 925 may be, for example, a communication card for a wired or wireless local area network (LAN), Bluetooth (registered trademark), wireless USB (WUSB), or the like. Furthermore, the communication device 925 may also be a router for optical communication, a router for asymmetric digital subscriber line (ADSL), a modem for various types of communication, or the like. The communication device 925, for example, transmits and receives signals or the like to and from the Internet or a different communication device using a predetermined protocol such as TCP/IP. Furthermore, the communication network 931 connected to the communication device 925 is a network connected wiredly or wirelessly, and is, for example, the Internet, a home LAN, infrared communication, radio wave communication, satellite communication, or the like.

The image capture device 933 captures real space, with various members, for example, an image capturing element such as a charge coupled device (CCD) or a complementary metal oxide semiconductor (CMOS), a lens for controlling formation of a subject image onto the image capturing element, and the like and then generates a captured image. The image capture device 933 may be an image capture device that captures a still image or an image capture device that captures a moving image.

Examples of the sensor 935 include various sensors such as a range sensor, an accelerometer, a gyro sensor, a geomagnetic sensor, an optical sensor, and a sound sensor. The sensor 935 acquires information regarding the state of the information processing apparatus 10 itself, such as the orientation of the housing of the information processing apparatus 10, and information regarding the peripheral environment of the information processing apparatus 10, such as brightness and noise in the periphery of the information processing apparatus 10. Furthermore, the sensor 935 may also include a global positioning system (GPS) sensor that receives GPS signals and measures the latitude, longitude, and altitude of the apparatus.

5. CONCLUSION

As described above, according to the embodiments of the present disclosure, there is provided an information processing apparatus including: a motion control unit configured to control, when an abnormality of a signal input for controlling a motion of an object is detected, the motion of the object such that the object continues a predetermined motion until a normality of the signal input is detected, the signal input responding to a motion of a user, in which until the motion of the object transitions to the predetermined motion after the detection of the abnormality of the signal input, the motion control unit controls the object such that the object performs at least one first intermediate motion, the at least one first intermediate motion being different from the motion of the object at the detection of the abnormality of the signal input and the predetermined motion. According to the configuration, the human-like motion of an object can be enhanced.

The preferred embodiments of the present disclosure have been described above in detail with reference to the accompanying drawings; however, the technical scope of the present technology is not limited to the examples. It is obvious that persons having ordinary knowledge in the technical field of the present disclosure can conceive various alternation examples or modification examples within the scope of the technical idea described in the claims, and it is also naturally understood that such alternation examples or modification examples belong to the technical scope of the present disclosure.

For example, it is also possible to create a program for enabling hardware such as a CPU, a ROM, and a RAM incorporated in a computer to perform functions equivalent to those of the control unit 110. Furthermore, a computer-readable recording medium on which the program is recorded may also be provided.

For example, if the operation of the information processing apparatus 10-1 is achieved, the position of each constituent is not particularly limited. Part of the processing of each unit in the information processing apparatus 10-1 may be performed by the information processing apparatus 10-2, or may be performed by a server apparatus (not illustrated). As a specific example, part or all of the blocks included in the control unit 110 in the information processing apparatus 10-1 may be provided in the information processing apparatus 10-2, the server apparatus (not illustrated), or the like. For example, part or all of the motion acquisition unit 111 and the motion determination unit 112 in the information processing apparatus 10-1 may be provided in the information processing apparatus 10-2, the server apparatus (not illustrated), or the like.

Similarly, if the operation of the information processing apparatus 10-2 is achieved, the position of each constituent is not particularly limited. Part of the processing of each unit in the information processing apparatus 10-2 may be performed by the information processing apparatus 10-1 or may be performed by a server apparatus (not illustrated). As a specific example, part or all of each block included in the control unit 110 of the information processing apparatus 10-2 may be provided in the information processing apparatus 10-1, the server apparatus (not illustrated), or the like. For example, part or all of the motion acquisition unit 111 and the motion determination unit 112 in the information processing apparatus 10-2 may be provided in the information processing apparatus 10-1, the server apparatus (not illustrated), or the like.

Furthermore, the effects described in the present specification are merely explanatory or exemplary, and are not limiting. That is, the technology according to the present disclosure can exhibit other effects obvious to those skilled in the art from the description of the present specification, together with or instead of the above effects.

Note that the following configurations are also within the technical scope of the present disclosure.

(1)

An information processing apparatus including:

a motion control unit configured to control, when an abnormality of a signal input for controlling a motion of an object is detected, the motion of the object such that the object continues a predetermined motion until a normality of the signal input is detected, the signal input responding to a motion of a user, in which until the motion of the object transitions to the predetermined motion after the detection of the abnormality of the signal input, the motion control unit controls the object such that the object performs at least one first intermediate motion, the at least one first intermediate motion being different from the motion of the object at the detection of the abnormality of the signal input and the predetermined motion.

(2)

The information processing apparatus according to (1) described above, in which the predetermined motion includes a first motion, and when the abnormality of the signal input is detected beyond a first period of time, the motion control unit allows a motion of a control target part of the object corresponding to a first recognition target part of the user associated with the abnormality of the signal input, to transition to the first motion.

(3)

The information processing apparatus according to (2) described above, in which when the abnormality of the signal input is detected beyond the first period of time, the motion control unit allows the motion of the control target part to transition to the first motion, on the basis of a position of the first recognition target part in a captured image.

(4)

The information processing apparatus according to (2) or (3) described above, in which when the first motion and a motion of a second recognition target part of the user are associated with each other, when the abnormality of the signal input is detected beyond the first period of time and when the motion of the second recognition target part is recognized, the motion control unit allows the motion of the control target part to transition to the first motion.

(5)

The information processing apparatus according to (4) described above, further including:

a motion generation unit configured to associate the motion of the first recognition target part with the motion of the second recognition target part when the motion of the first recognition target part and the motion of the second recognition target part are recognized from a single captured image.

(6)

The information processing apparatus according to any one of (2) to (5) described above, in which the predetermined motion includes a second motion, and when the abnormality of the signal input is detected beyond a second period of time longer than the first period of time, the motion control unit allows an entirety of the motion of the object to transition to the second motion.

(7)

The information processing apparatus according to (6) described above, in which when the abnormality of the signal input is detected beyond the second period of time, the motion control unit allows the entirety of the motion of the object to transition to the second motion, on the basis of a position of the first recognition target part in a captured image.

(8)

The information processing apparatus according to (6) described above, further including:

a motion generation unit configured to generate the second motion on the basis of an action state of the user, when the action state of the user satisfies a predetermined condition.

(9)

The information processing apparatus according to (8) described above, in which the predetermined condition includes at least one of a condition where an amount of speech of the user is smaller than a predetermined amount or a condition where movement of the user is smaller than predetermined movement.

(10) The information processing apparatus according to any one of (6) to (9) described above,
in which the second motion includes a plurality of motions different mutually, and
when the abnormality of the signal input is detected beyond the second period of time, the motion control unit controls the entirety of the motion of the object such that the entirety of the motion of the object is switchable between the plurality of motions.

(11) The information processing apparatus according to any one of (6) to (9) described above,
in which when the abnormality of the signal input is detected beyond the second period of time, the motion control unit allows the entirety of the motion of the object to transition to the second motion selected on the basis of the motion of the user.

(12) The information processing apparatus according to any one of (1) to (11) described above,
in which when the motion of the user recognized from the signal input does not fall within a predetermined motion range, the abnormality of the signal input is detected.

(13) The information processing apparatus according to any one of (1) to (11) described above, further including:
a reception determination unit configured to detect the abnormality of the signal input received from an external device that generates the signal input responsive to the motion of the user.

(14) The information processing apparatus according to (13) described above,
in which when a value for controlling the motion of the object, indicated by the signal input received from the external device, indicates a successively identical value for a predetermined number of times or more, the reception determination unit detects the abnormality of the signal input.

(15) The information processing apparatus according to (13) described above,
in which when the signal input is not received beyond a predetermined period of time, the reception determination unit detects the abnormality of the signal input.

(16) The information processing apparatus according to any one of (1) to (15) described above,
in which when the normality of the signal input is detected after the abnormality of the signal input is detected, until the motion control unit allows the motion of the object to transition from the predetermined motion so as to be based on the motion of the user, the motion control unit controls the object such that the object performs at least one second intermediate motion that is different from the predetermined motion.

(17) The information processing apparatus according to any one of (1) to (16) described above,
in which the object includes a real object existing in real space.

(18) The information processing apparatus according to any one of (1) to (16) described above,
in which the object includes a virtual object existing in virtual space.

(19) An information processing method with a processor, the method including:
controlling, when an abnormality of a signal input for controlling a motion of an object is detected, the motion of the object such that the object continues a predetermined motion until a normality of the signal input is detected, the signal input responding to a motion of a user; and controlling, until the motion of the object transitions to the predetermined motion after the detection of the abnormality of the signal input, the object such that the object performs at least one first intermediate motion, the at least one first intermediate motion being different from the motion of the object at the detection of the abnormality of the signal input and the predetermined motion.

(20) A program for causing a computer to function as an information processing apparatus including:
a motion control unit configured to control, when an abnormality of a signal input for controlling a motion of an object is detected, the motion of the object such that the object continues a predetermined motion until a normality of the signal input is detected, the signal input responding to a motion of a user,
in which until the motion of the object transitions to the predetermined motion after the detection of the abnormality of the signal input, the motion control unit controls the object such that the object performs at least one first intermediate motion, the at least one first intermediate motion being different from the motion of the object at the detection of the abnormality of the signal input and the predetermined motion.

REFERENCE SIGNS LIST

1 Information processing system
10 Information processing apparatus
20 Avatar
30 Robot
110 Control unit
111 Motion acquisition unit
112 Motion determination unit
113 Communication control unit
114 Reception determination unit
115 Motion generation unit
116 Motion control unit
120 Image capture unit
130 Sound information detection unit
140 Storage unit
150 Communication unit
160 Display unit
170 Sound information output unit

The invention claimed is:
1. An information processing apparatus, comprising:
a motion control unit configured to:
control, based on detection of an abnormality of a signal input to control a motion of an object, the motion of the object such that the object continues a specific motion until a normality of the signal input is detected, wherein the signal input is based on a motion of a user; and control the object to perform at least one first intermediate motion until the motion of the object transitions to the specific motion after the detection of the abnormality of the signal input,
wherein the at least one first intermediate motion is different from both the motion of the object at the detection of the abnormality of the signal input and the specific motion.

2. The information processing apparatus according to claim 1, wherein
the specific motion includes a first motion, and
the motion control unit is further configured to allow a motion of a control target part of the object to transition to the first motion based on the abnormality of the signal input detected beyond a first period of time, wherein
the control target part of the object corresponds to a first recognition target part of the user, and
the abnormality of the signal input is associated with the first recognition target part of the user.

3. The information processing apparatus according to claim 2, wherein the transition of the motion of the control target part to the first motion is based on a position of the first recognition target part in a captured image associated with the user.

4. The information processing apparatus according to claim 2, wherein the transition of the motion of the control target part to the first motion is based on:
an association between the first motion and a motion of a second recognition target part of the user,
the abnormality of the signal input detected beyond the first period of time, and
recognition of the motion of the second recognition target part.

5. The information processing apparatus according to claim 4, further comprising a motion generation unit configured to associate the motion of the first recognition target part with the motion of the second recognition target part based on recognition of both the motion of the first recognition target part and the motion of the second recognition target part from a single captured image.

6. The information processing apparatus according to claim 2, wherein
the specific motion includes a second motion,
the motion control unit is further configured to allow the motion of the object to transition to the second motion based on the abnormality of the signal input detected beyond a second period of time, and
the second period of time is longer than the first period of time.

7. The information processing apparatus according to claim 6, wherein the transition of the motion of the object to the second motion is based on a position of the first recognition target part in a captured image associated with the user.

8. The information processing apparatus according to claim 6, further comprising a motion generation unit configured to generate the second motion based on an action state of the user which satisfies a specific condition.

9. The information processing apparatus according to claim 8, wherein the specific condition includes at least one of a first condition in which an amount of speech of the user is smaller than a specific amount or a second condition in which a movement of the user is smaller than a specific movement.

10. The information processing apparatus according to claim 6, wherein the second motion includes a plurality of motions which are mutually different, and
the motion of the object is switchable between the plurality of motions based on the abnormality of the signal input detected beyond the second period of time.

11. The information processing apparatus according to claim 6, wherein
the transition of the motion of the object to the second motion is based on the abnormality of the signal input detected beyond the second period of time, and
the second motion is selected from a plurality of mutually different motions based on the motion of the user.

12. The information processing apparatus according to claim 1, wherein
the abnormality of the signal input is detected based on the motion of the user which does not fall within a specific motion range, and
the motion of the user is recognized from the signal input.

13. The information processing apparatus according to claim 1, further comprising a reception determination unit configured to detect the abnormality of the signal input received from an external device, wherein the external device generates the signal input responsive to the motion of the user.

14. The information processing apparatus according to claim 13, wherein
the signal input received from the external device indicates a value that controls the motion of the object, and
the abnormality of the signal input is detected based on the value indicates a successively identical value for at least specific number of times.

15. The information processing apparatus according to claim 13, wherein the abnormality of the signal input is detected based on the signal input not received beyond a specific period of time.

16. The information processing apparatus according to claim 1, wherein until the motion control unit allows the motion of the object to transition from the specific motion so as to be based on the motion of the user, the motion control unit is further configured to control the object to perform at least one second intermediate motion that is different from the specific motion, based on the normality of the signal input detected after the detection of the abnormality of the signal input.

17. The information processing apparatus according to claim 1, wherein the object includes a real object existing in real space.

18. The information processing apparatus according to claim 1, wherein the object includes a virtual object existing in virtual space.

19. An information processing method with a processor, the method comprising:
controlling, based on detection of an abnormality of a signal input for controlling a motion of an object, the motion of the object such that the object continues a specific motion until a normality of the signal input is detected, wherein the signal input is based on a motion of a user; and
controlling, until the motion of the object transitions to the specific motion after the detection of the abnormality of the signal input, the object to perform at least one first intermediate motion,
wherein the at least one first intermediate motion is different from both the motion of the object at the detection of the abnormality of the signal input and the specific motion.

20. A non-transitory computer-readable medium having stored thereon, computer-executable instructions which, when executed by a computer, cause the computer to execute operations, the operations comprising:
- controlling, based on detection of an abnormality of a signal input for controlling a motion of an object, the motion of the object such that the object continues a specific motion until a normality of the signal input is detected, wherein the signal input is based on to a motion of a user; and
- controlling the object to perform at least one first intermediate motion until the motion of the object transitions to the specific motion after the detection of the abnormality of the signal input,
  - wherein the at least one first intermediate motion is different from both the motion of the object at the detection of the abnormality of the signal input and the specific motion.

21. An information processing apparatus, comprising:
a motion control unit configured to:
- control, based on detection of an abnormality of a signal input to control a motion of an object, the motion of the object such that the object continues a specific motion until a normality of the signal input is detected,
  - wherein the signal input is based on a motion of a user;
- control the object to perform at least one first intermediate motion until the motion of the object transitions to the specific motion after the detection of the abnormality of the signal input,
- wherein
  - the at least one first intermediate motion is different from both the motion of the object at the detection of the abnormality of the signal input and the specific motion, and
  - the specific motion includes a first motion; and
- allow a motion of a control target part of the object to transition to the first motion based on the abnormality of the signal input detected beyond a first period of time,
- wherein
  - the control target part of the object corresponds to a first recognition target part of the user, and
  - the abnormality of the signal input is associated with the first recognition target part of the user.

* * * * *